(12) United States Patent
Le Taillandier De Gabory et al.

(10) Patent No.: US 9,729,229 B2
(45) Date of Patent: Aug. 8, 2017

(54) OPTICAL SPATIAL-DIVISION MULTIPLEXED TRANSMISSION SYSTEM AND TRANSMISSION METHOD

(71) Applicant: NEC Corporation, Minato-ku, Tokyo (JP)

(72) Inventors: Emmanuel Le Taillandier De Gabory, Tokyo (JP); Toshiharu Ito, Tokyo (JP); Manabu Arikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/782,831

(22) PCT Filed: Apr. 9, 2013

(86) PCT No.: PCT/JP2013/002412
§ 371 (c)(1),
(2) Date: Oct. 7, 2015

(87) PCT Pub. No.: WO2014/167596
PCT Pub. Date: Oct. 16, 2014

(65) Prior Publication Data
US 2016/0056889 A1 Feb. 25, 2016

(51) Int. Cl.
*H04B 10/61* (2013.01)
*H04J 14/00* (2006.01)
(Continued)

(52) U.S. Cl.
CPC ..... *H04B 10/0775* (2013.01); *H04B 10/2581* (2013.01); *H04B 10/611* (2013.01);
(Continued)

(58) Field of Classification Search
CPC .. H04B 10/611; H04B 10/615; H04B 10/616; H04J 14/00; H04J 14/04
See application file for complete search history.

(56) References Cited

U.S. PATENT DOCUMENTS 9,036,751 B1 * 5/2015 Wang ............... H04L 25/03
375/232
9,240,843 B1 * 1/2016 Malouin ........... H04B 10/616
(Continued)

FOREIGN PATENT DOCUMENTS

JP 2004193817 A 7/2004
JP 2010-193204 A 9/2010
(Continued)

OTHER PUBLICATIONS

D. Qian et al., "101.7-Tb/s (370×294-Gb/s) PDM-128QAM-OFDM Transmission over 3×55-km SSMF using Pilot-based Phase Noise Mitigation", OFC/NFOEC 2011 (PDPB5).
(Continued)

*Primary Examiner* — Nathan Curs

(57) ABSTRACT

The reception (102) reception unit includes; a first processing unit processing a first signal received from a source channel, and including a filtering unit to filter said first signal in digital domain, and extract unit to extract a information from said first signal; a second processing unit processing a second signal received from a destination channel, and said source channel and said destination channel are distinct each other; a third processing unit providing said information extracted from said first signal to said second signal said third processing unit executes; providing said information from said first processing unit to said second processing unit using information lanes of a clock rate strictly lower than a symbol rate of said second signal, a monitoring unit to generate a monitor signal according to the quality of said second signal; and a control unit controlling a skew between said first signal and said second signal in a bandwidth of said filtering units in said first processing unit.

10 Claims, 16 Drawing Sheets

(51) Int. Cl.
*H04B 10/077* (2013.01)
*H04J 14/04* (2006.01)
*H04L 25/14* (2006.01)
*H04B 10/2581* (2013.01)

(52) U.S. Cl.
CPC ....... *H04B 10/615* (2013.01); *H04B 10/6163* (2013.01); *H04B 10/6164* (2013.01); *H04B 10/6165* (2013.01); *H04J 14/00* (2013.01); *H04J 14/04* (2013.01); *H04L 25/14* (2013.01)

(56) References Cited

U.S. PATENT DOCUMENTS

| | | |
|---|---|---|
| 2010/0209121 A1 | 8/2010 | Tanimura |
| 2012/0020660 A1* | 1/2012 | Le Taillandier De Gabory .............. H04B 10/0775 398/25 |
| 2015/0229438 A1* | 8/2015 | Le Taillandier De Gabory .............. H04B 10/2581 398/182 |

FOREIGN PATENT DOCUMENTS

| | | |
|---|---|---|
| JP | 2012-524425 A | 10/2012 |
| WO | 2012117565 A1 | 9/2012 |

OTHER PUBLICATIONS

H. Takahashi et al., "First Demonstration of MC-EDFA-Repeatered SDM Transmission of 40×128-Gbit/s PDM-QPSK Signals per Core over 6,160-km 7-core MCF", ECOC 2012 (Th.3.C.3).

Benjamin J. Puttnam et al., "Investigating Self-Homodyne Coherent Detection in a 19-core Spatial-Division-Multiplexed Transmission Link", ECOC 2012, (Tu.3.C.3).

Emmanuel Le Taillandier de Gabory et al., "A Shared Carrier Reception and Processing Scheme for Compensating Frequency Offset and Phase Noise of Space-Division Multiplexed Signals over Multicore Fibers", OFC 2013, (OM2C.2).

International Search Report for PCT Application No. PCT/JP2013/002412, mailed on Dec. 16, 2013.

* cited by examiner

F I G. 1
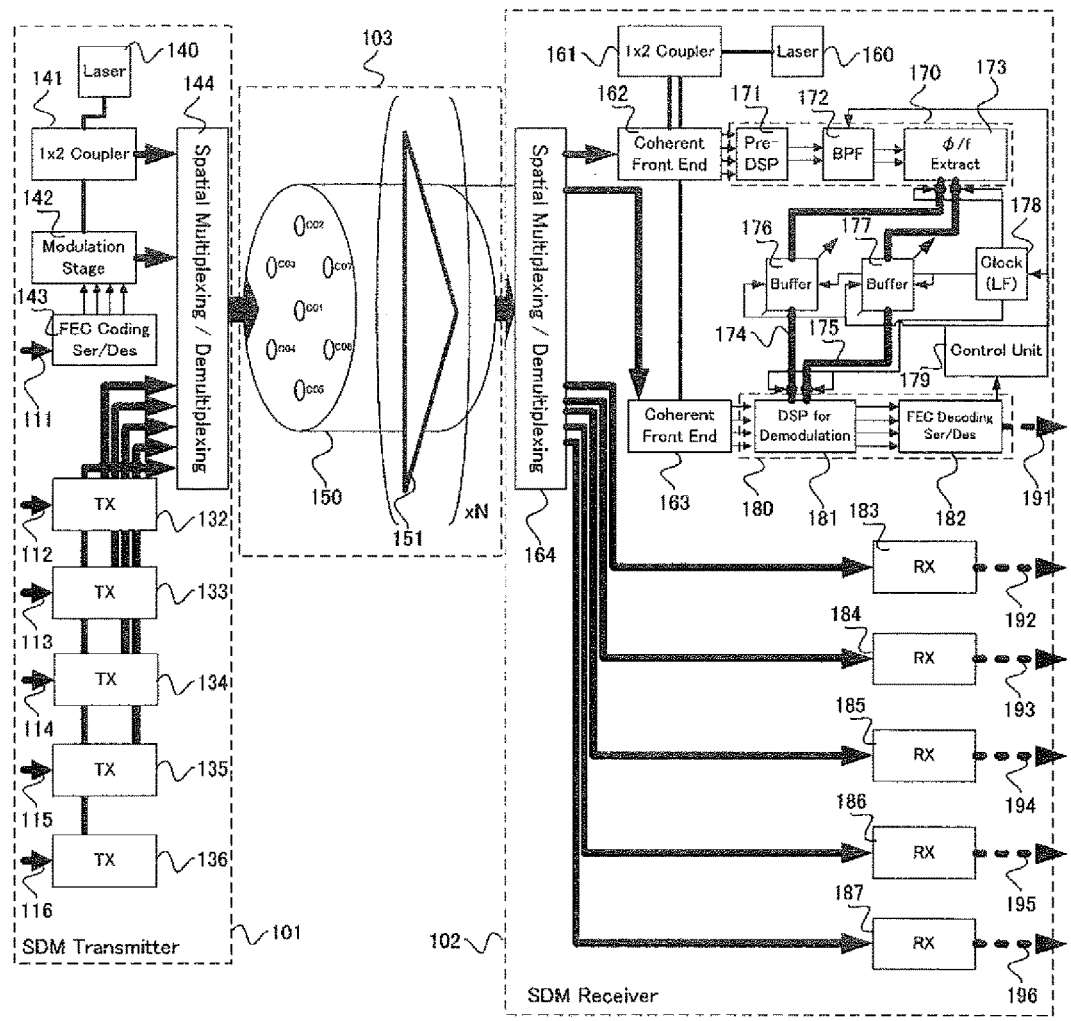

F I G. 3A
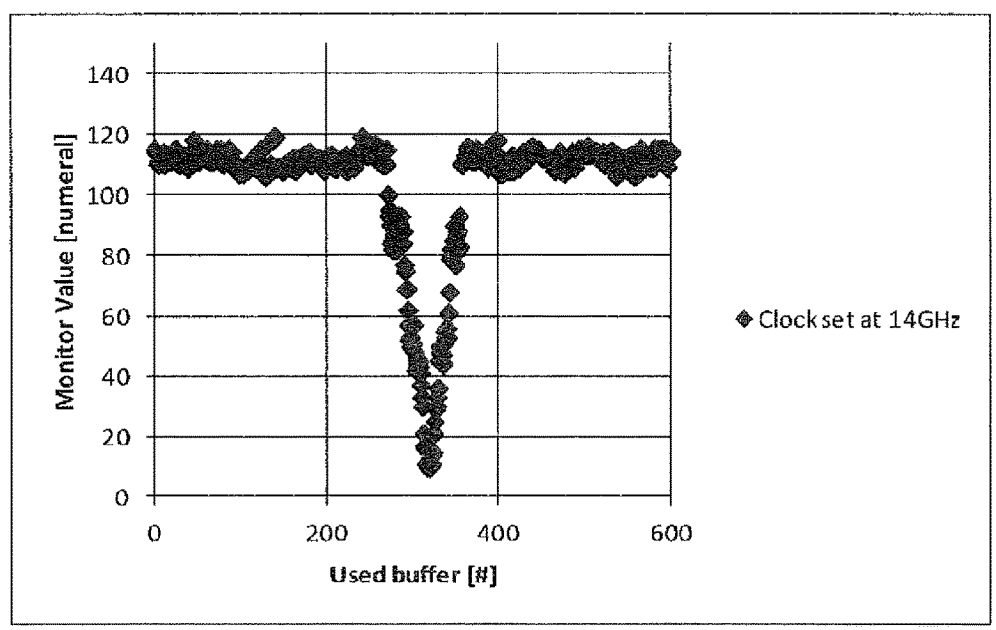

F I G. 3D
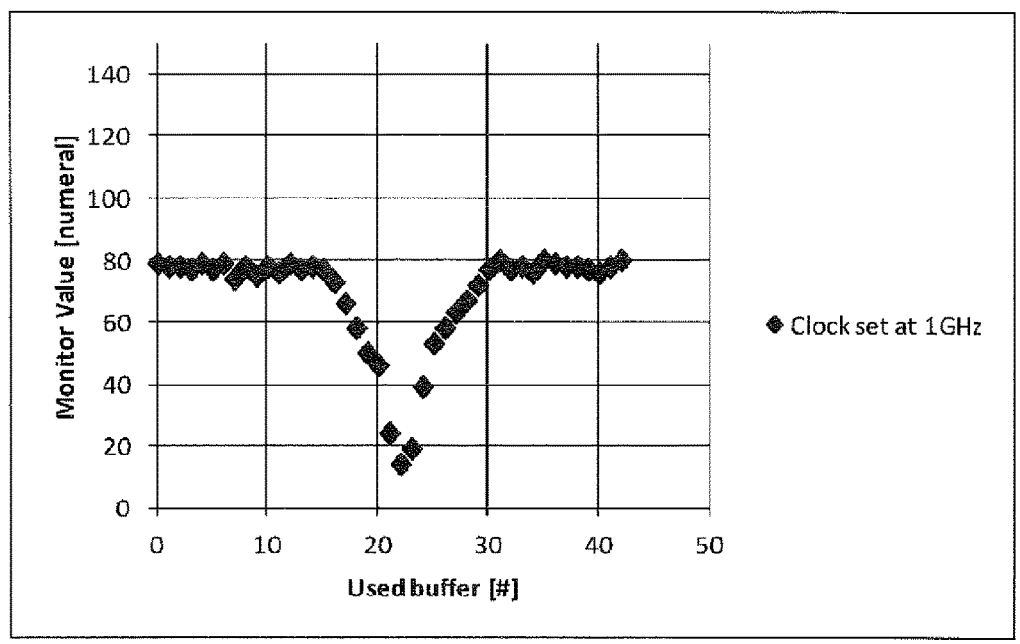

F I G. 3 F
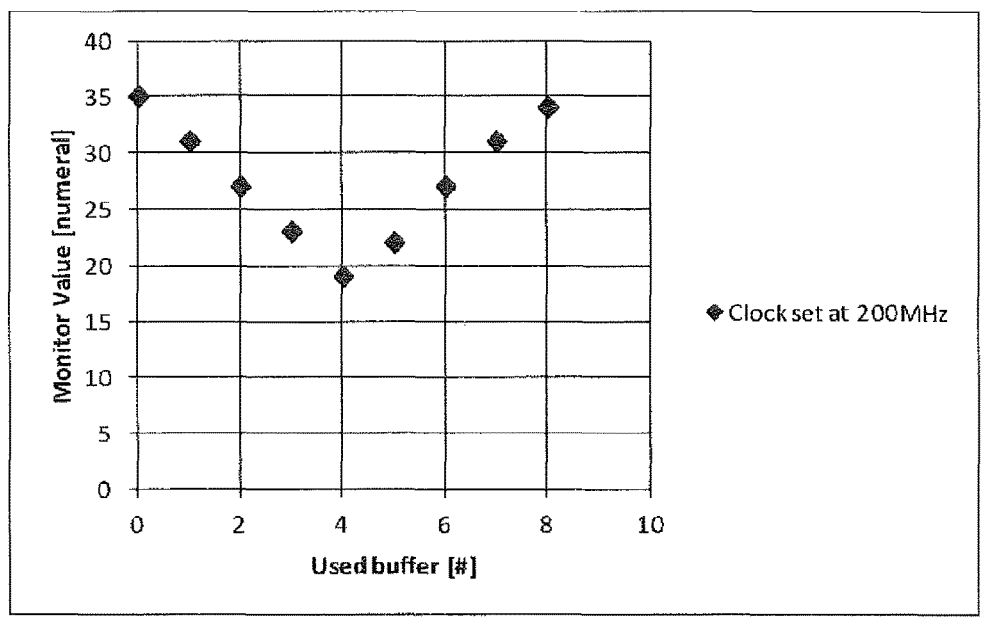

F I G. 3G
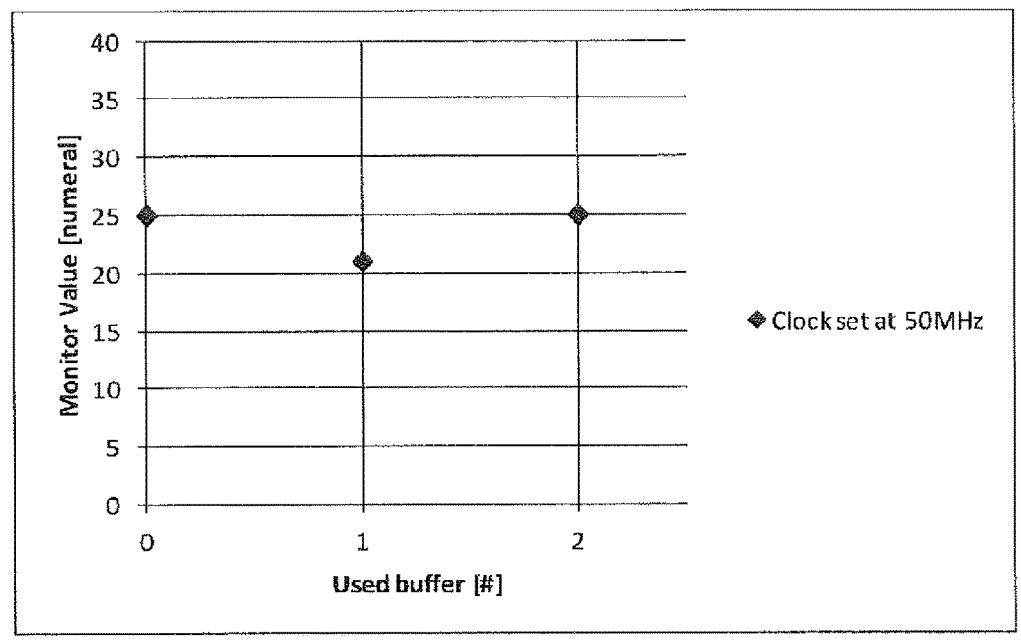

F I G. 7
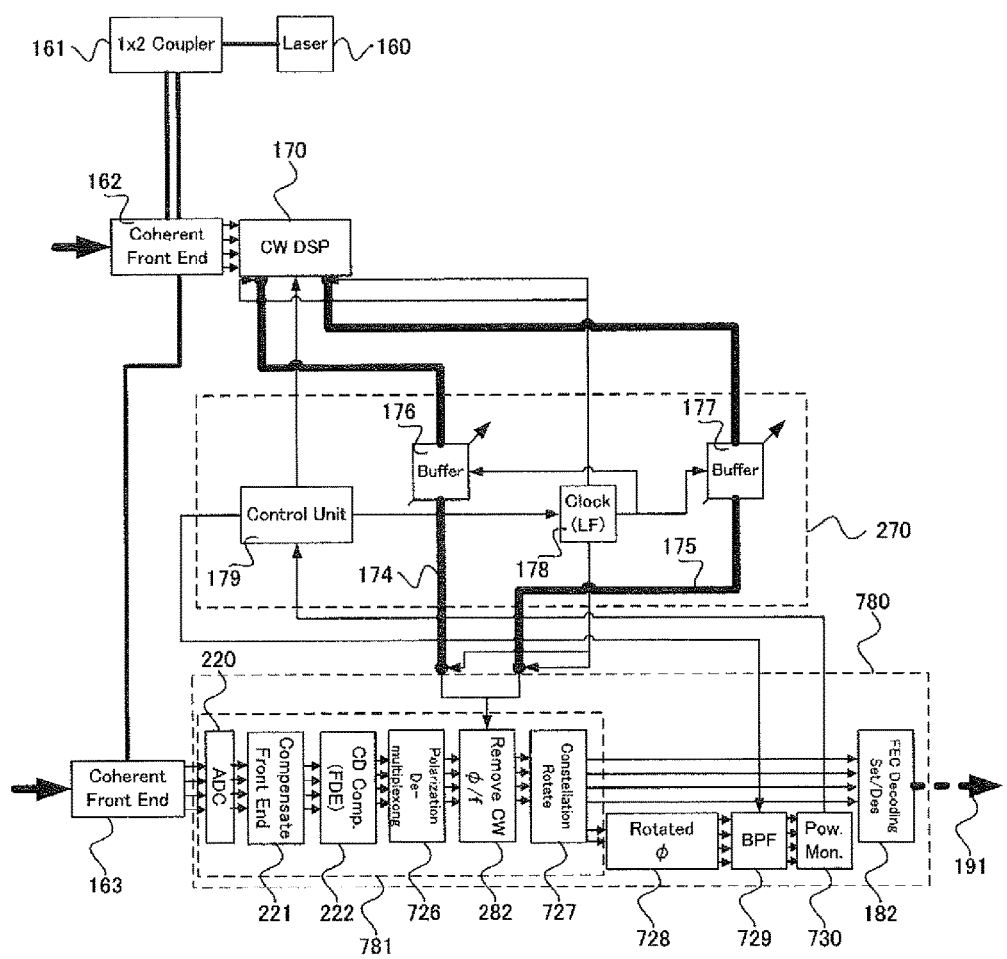

F I G. 8
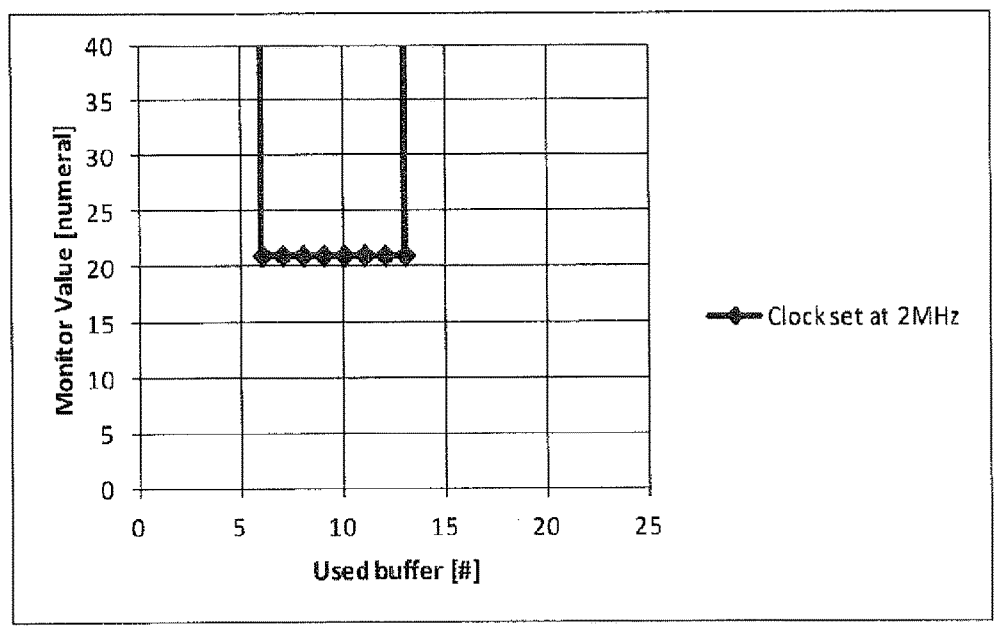

OPTICAL SPATIAL-DIVISION MULTIPLEXED TRANSMISSION SYSTEM AND TRANSMISSION METHOD

TECHNICAL FIELD

The present invention relates generally to optical communication technologies and more particularly to optical communication technologies, where the data is transmitted between parallel channels multiplexed spatially inside the fiber.

BACKGROUND ART

In order to optimize the investment in optical fiber links, it is desirable to increase the capacity of said links. This can be achieved by increasing the Spectral Efficiency (SE) of the signals transmitted on said links. A common way to achieve is to use more efficient modulation formats for the transmitted information. This can be used in conjunction with Wavelength Division Multiplexing (WDM). Higher capacity systems with line rate in the range of 40 Gb/s or 100 Gb/s utilize modulation scheme based on Quadrature Phase Shift Keying (QPSK), which codes the information on four phase levels. Therefore, two binary bits can be coded per transmitted symbol. In this manner, the necessary bandwidth of the optical spectrum required to transmit information is used more efficiently, in term of spectral efficiency, enabling the transmission of more information on a fixed bandwidth. For instance, 100 Gb/s signals using Polarization Multiplexed QPSK (PM-QPSK) formats can be transmitted using about 90 channels spaced by 50 GHz on the conventional band (C band) of the spectrum. Such systems are able to transmit roughly 9 Tb/s over a single fiber. Higher capacities can be achieved with more complex modulation formats. For instance, in NPL1 the use of Quadrature Amplitude Modulation format enabled to transmit 101.7 Tb/s. However, this increase in the transmission capacity of the system requires a high complexity in the transmitter and receivers, for a transmission distance limited to 165 km. This is namely not sufficient for long haul applications where transmission over more than 1000 km is required.

In order to increase the capacity of transmission through one fiber while maintaining the possibility of the transmission over long distances, new fibers are being investigated. In NPL2, a Multi Core Fiber (MCF), which consists of several cores conducting optical signals within the same fiber and multicore (MC)—erbium doped fiber amplifier (EDFA), which consists in a fiber amplifier with MCF as gain medium, are used to transmit 40 wavelength of 128 Gb/s PM-QPSK signal over 6160 km of 7-core MCF. This system demonstration highlights the possibility to multiply the system capacity by N, where N is the number of core of MCF, namely N=7 in NPL2, without trading capacity for distance. By using MCF, it is possible to use the multiplicity of cores to spatially multiplex signals, in addition to WDM in each core, increasing the capacity transmitted through fibers without sacrificing the transmitted distance.

Furthermore, as the system capacity can be dramatically increased with the use of MCF, several approaches take advantage of SDM in order to simplify transmitter or receiver used in the transmission system or to reduce their cost. For instance, in NPL3, self homodyne (SH) method is applied on one core of SDM: in that case, the local oscillator (LO) used for coherent reception of signal is generated from the same laser as signal, transmitted through one core and used at the receiver side. This method enables a reduction of the number of used lasers and the simplification of the digital signal processing (DSP) of the receiver. These advantages come at the cost of 1/N of the total system capacity, where N is the number of core of the MCF, which is limited when the number of core grows.

Another approach is presented in NPL4 with the shared carrier reception (SCR) method. In this method, one core is dedicated to the transmission of the non-modulated lightwave carrier, which can be called continuous wave (CW) light, which was used to generate an optical signal. The CW light is received and processed with a dedicated receiver and DSP. According to the result of the DSP of the CW light, which is used in the signal processing, better demodulation is made possible, such as wider compensation of frequency offset between signal and LO as well as compensation of phase noise of the signal. This results in the possibility to use more diverse laser sources and to reduce system cost. The SCR method enables also a reduction of the number of lasers in the system, reducing cost. Again in NPL4, these benefits come at the cost of 1/N of the total system capacity, where N is the number of core of the MCF, which is limited when the number of core grows.

CITATION LIST

Patent Literature

[PTL 1] Japanese Patent Application Laid-Open Publication No. JP2004-193817
[PTL 2] Patent Application Laid-Open Publication No. WO 2012/117565

Non Patent Literature

[NPL 1] D. Qian et al., "101.7-Tb/s (370×294-Gb/s) PDM-128QAM-OFDM Transmission over 3×55-km SSMF using Pilot-based Phase Noise Mitigation", OFC/NFOEC 2011 (PDPB5).
[NPL 2] H. Takahashi et al., "First Demonstration of MC-EDFA-Repeatered SDM Transmission of 40×128-Gbit/s PDM-QPSK Signals per Core over 6,160-km 7-core MCF", ECOC 2012 (Th.3.C.3).
[NPL 3] Benjamin J. Puttnam et al., "Investigating Self-Homodyne Coherent Detection in a 19-core Spatial-Division-Multiplexed Transmission Link", ECOC 2012, (Tu.3.C.3)
[NPL 4] Emmanuel Le Taillandier de Gabory et al., "A Shared Carrier Reception and Processing Scheme for Compensating Frequency Offset and Phase Noise of Space-Division Multiplexed Signals over Multicore Fibers", OFC 2013, (OM2C.2)

SUMMARY OF INVENTION

Technical Problem

Nevertheless, skew between cores exist in MCF and amplifiers, which results in timing difference between parallel SDM paths. For instance, NPL4 relates path difference in the order of 20 ns for only 294 km over MCF including amplifiers. Moreover, environmental changes such as temperature may affect differently cores with different spatial locations. For instance, for a variation of 4° C. of room temperature in laboratory, NPL3 relates a variation of 40 ps for a MCF length of 10 km only. Considering distances in the order of 1000 km and wider temperature variations such as expected in outdoor field, variation in skew between cores could increase by several orders of magnitude from the one reported in NPL3. Therefore, even with the use of MCF, skew between SDM paths exists, and is expected to grow with distance. Furthermore, the skew between SDM paths varies with conditions and time.

In the case of SCR, the timing between signal and CW light required to obtain improvement in quality of the received signal through phase noise compensation (PNC) is reported as below 0.8 ns in NPL4. Therefore, skew between SDM paths through MCF needs to be adjusted and also its variations need to be tracked in order to enhance the signal quality through PNC.

NPL3 proposes a method to adjust skew between SDM path for the SH method. Such a method could also be applied for the case of the SCR method. In the method of NPL3, NRZ signals are transmitted through different SDM paths and the path lengths are adjusted in order to reduce the skew between the received NRZ signals over different SDM paths. This method was applied on 10 km long MCF without amplification. Longer transmission would require lowering the NRZ rate not to be affected by chromatic dispersion (CD), which results in less precision in skew adjustment. Furthermore, this method can be applied only before the system transmits data as the NRZ signal for adjustment is transmitted on the same path as data. Therefore, this method cannot be applied in service to compensate for variations of the skew between paths.

Besides, PTL1 relates to a method to adjust skew between parallel paths. This method relies on inserting symbols on each of the parallel lanes and detecting the skew between these symbols. However, this method cannot be used with the SCR method as with SCR, one of the multiplexed paths is non-modulated, therefore no data or training can be inserted on the CW light.

Furthermore, PTL2 relates to a method to detect skew between parallel light including the case of SDM. The method of PTL2 requires carving pulses or stopping carving pulses at regular intervals in time on the different parallel signals to detect skew. However, the method of PTL2 requires additional hardware including the carver for carving the CW light. There is room for improvement in cost and size of the skew compensation method.

Therefore there is a need for improvement of transmission characteristics for SDM signals and to compensate skew as well as skew variations between SDM channels, for improvement in the precision, cost and size of skew detection systems for SDM paths.

An exemplary object of the invention is to provide an optical transmission system using Spatial-Division Multiplexed channels, with information recovered from one of the channels used in the signal processing of other channels, and with precise skew compensation between said channels.

Solution to Problem

In one embodiment, there is provided a transmission system including:
a transmission unit of lightwave over several spatial-division multiplexed channels; and
reception units receiving signals from said channels; wherein said reception unit includes;
a first processing unit processing a first signal received from a source channel, said source channel is one of said channels, and including a filtering unit to filter said first signal in digital domain, and extract unit to extract an information from said first signal;
a second processing unit processing a second signal received from a destination channel, said destination channel is one of said channels and said source channel and said destination channel are distinct each other;
a third processing unit providing said information extracted from said first signal to said second signal said third processing unit executes;
providing said information from said first processing unit to said second processing unit using information lanes of a clock rate strictly lower than a symbol rate of said second signal, each of said information lanes includes a digital buffer driven at the same rate as said information lane, said information provided from said first processing unit is used in said second processing unit;
a monitoring unit to generate a monitor signal according to the quality of said second signal; and
a control unit, controlling a skew between said first signal and said second signal in a bandwidth of said filtering units in said first processing unit, said control unit uses a value of said monitor signal and said digital buffer on said information lane between said first processing unit and said second processing unit.

In another embodiment, there is provided a reception units receiving signals of lightwave over several spatial-division multiplexed channels; wherein said reception unit includes;
reception units receiving signals from said channels; wherein said reception unit includes;
a first processing unit processing a first signal received from a source channel, said source channel is one of said channels, and including a filtering unit to filter said first signal in digital domain, and extract unit to extract a information from said first signal;
a second processing unit processing a second signal received from a destination channel, said destination channel is one of said channels and said source channel and said destination channel are distinct each other;
a third processing unit providing said information extracted from said first signal to said second signal said third processing unit executes;
providing said information from said first processing unit to said second processing unit using information lanes of a clock rate strictly lower than a symbol rate of said second signal, each of said information lanes includes a digital buffer driven at the same rate as said information lane, said information provided from said first processing unit is used in said second processing unit;
a monitoring unit to generate a monitor signal according to the quality of said second signal; and
a control unit, controlling a skew between said first signal and said second signal in a bandwidth of said filtering units in said first processing unit, said control unit uses a value of said monitor signal and said digital buffer on said information lane between said first processing unit and said second processing unit.

BRIEF DESCRIPTION OF DRAWINGS

The above and other advantages and features of the present invention will be more apparent from the following descriptions taken in conjunction with the accompanied drawings, in which:
FIG. 1 is a schematic representation of an optical system, using space division multiplexing, transmitting and receiving optical signals according to a first exemplary embodiment of the invention.

FIG. 3A is a monitor signal for various buffer settings at a clock of 14 GHz, according to an implementation of the invention.

FIG. 3D is a monitor signal for various buffer settings at a clock of 1 GHz, according to an implementation of the invention.

FIG. 3F is a monitor signal for various buffer settings at a clock of 200 MHz, according to an implementation of the invention.

FIG. 3G is a monitor signal for various buffer settings at a clock of 50 MHz, according to an implementation of the invention.

FIG. 7 is a schematic representation of an optical reception system, using space division multiplexing according to an implementation of the invention.

FIG. 8 is a monitor signal for various buffer settings at a clock of 2 MHz, according to an implementation of the invention.

DESCRIPTION OF EMBODIMENTS

First Description of Embodiments

Figure 2:
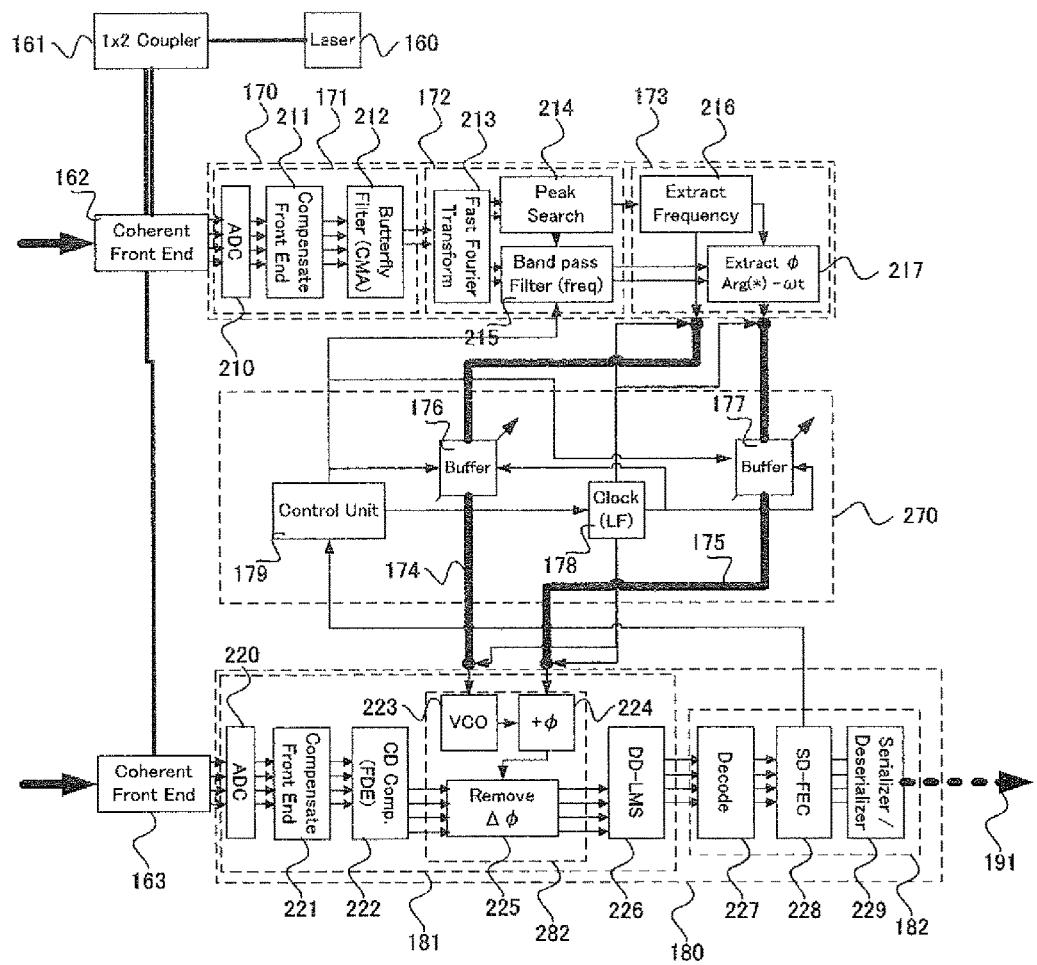
FIG. 2 is a schematic representation of an optical reception system, using space division multiplexing according to an implementation of the invention.

FIG. 1 is a schematic representation of an optical system including an optical transmitter 101, which uses SDM, an optical receiver 102, which uses SDM and a transmission line 103, which uses MCF. The transmitter 101 and the receiver 102 are communicating through the line 103, which is composed of N spans of multicore fiber, with 7 cores, with multicore amplification at each span. Higher or lower core count can be used, provided that MCF 150, amplifier 151, transmitter 101 and receiver 102 are equipped accordingly to the number of cores.

The transmitter 101 is fed with 6 binary data lanes denoted with the numerals 111, 112, 113, 114, 115 and 116, which are used to modulate six respective lightwave signals with the respective modulation stage 142, transmitters 132, 133, 134, 135 and 136. The six lightwave signals are spatially multiplexed with the multiplexer 144 and are launched in 6 cores of the MCF, using all cores except one of the multicore fiber. The modulation stage 142 comprises driver amplifiers connected to an optical modulator to modulate lightwave signal according to the tributaries signal provided by the circuit 143, which performs forward error correction (FEC) encoding and serializing or de-serializing from the bit stream 111. The light modulated by the stage 142 is provided by a laser 140, which output is split by the polarization maintaining 1×2 coupler denoted with the numeral 141. The other output of the coupler 141 is not modulated and is multiplexed by the spatial multiplexer 144 to be launched into one core of the MCF 150. For instance, the non modulated output of the coupler 141 can be launched into the core C01 later used as source channel, the output of the stage 142 into the core C02 later used as destination channel, the output of the respective transmitters 132, 133, 134, 135, 136 into the respective cores C03, C04, C05, C06 and C07 of the MCF 150. Each of the transmitters denoted with the numerals 132, 133, 134, 135 and 136 comprise a laser source, a modulating stage comparable to 142 and a circuit for FEC encoding, serializing and de-serializing.

The receiver 102 comprises a spatial de-multiplexer 164, which de-multiplexes the output of the MCF 150 into 7 lightwave signals. The output of the core C01, used as source channel, which carries the non modulated light from the coupler 141, is fed to the coherent frontend 162. The frontend 162 comprises a polarization diversity 90o hybrid used for coherent reception, four balanced photodiodes and trans-impedance amplifiers at their outputs. The output of the core C02, used as destination channel, which carried the lightwave signal modulated by the stage 142, is fed to the coherent frontend 163, which can be identical to the frontend 162. The outputs of the respective cores C03, C04, C05 and C06 are fed to the respective receivers 183, 184, 185, 186 and 187, which demodulated their respective lightwave signals and generate accordingly the respective binary data streams 192, 193, 194, 195 and 196. The LO of the frontends 162 and 163 are generated from the same laser 160, which output is split with the coupler 161, which can be identical to the coupler 141. The four electrical outputs of the frontend 162 are processed by the circuit 170, which is composed of the consecutive digital signal processing units 171, 172 and 173. The unit 171 comprises analog to digital conversion (ADC), processing for correction of imperfections of reception and polarization tracking, which outputs the signal from the processed single polarization CW light. The unit 172 is a digital filter, which band pass bandwidth is set by the control unit 179. The output of the filter 172 is process by the unit 173, which retries information on the frequency offset and phase difference between the LO 160 and the received CW light. The information on frequency and phase are output through the two sub-lanes of low speed respectively denoted 174 and 175. Besides, the four electrical outputs of the frontend 163 are processed by the circuit 180 which demodulated the received signal and generates accordingly the binary data stream 191. The circuit 180 comprises a unit 181 for analog to digital conversion, signal processing and demodulation. The consecutive unit 182 performs decision, FEC decoding and error correction, and serialization or de-serialization. A monitor signal generated according to the number of errors corrected by the FEC of the unit 182 is provided to the control unit 179. The unit 179 also controls the setting of the variable digital buffer units 176 and 177, which are placed on the respective lanes 174 and 175 to control their timing. The unit 179 also controls the low frequency clock generator 178, which is used by the digital buffer units 176 and 177 and the data lanes 174 and 175. The receiver units 183, 184, 185, 186 and 187 comprise local oscillators, coherent frontends and data processing circuits for reception of their respective lightwave inputs.

FIG. 2 is a schematic representation of the receivers of FIG. 1, which are used to receive and process the information from the cores C01 and C02 of the MCF 150. The elements denoted with the numerals from 160 to 163, 170 to 182 and 191 are described on FIG. 1. The processing unit 171 is composed of the consecutive ADC 210, digital processing unit 211, which compensates for the receiver imperfections and digital signal processing 212, which comprises butterfly filters updated according to the constant modulus algorithm (CMA) in order to track the polarization of the input CW signal. The output of the unit 212 is the degenerate result of the processing according to CMA. The filtering unit 172 is composed of the sub-units 213, 214 and 215. The output of the butterfly filter 212 is processed in frequency domain according to the fast Fourier transform (FFT) unit 213. The output of the FFT unit 213 is fed into the two units 214 and 215. The unit 214 searches for the dominant peak in the spectrum output of the unit 213, searching for the maximum value of the spectrum values, and it transfers this information to the processing units 215 and 216. The band pass filter of the processing unit 215 is centered on this peak which is retrieved by the unit 214. The bandwidth of the filter 215 is set by the control unit 179. The filter 215 performs filtering in the frequency domain and the filtered output is fed into the processing unit 217. The filter 215 can be for instance of rectangular. However, other shapes can be applied. The unit 216 generates a signal made of a scalar value according to the frequency retrieved by the unit 214. Said signal generated by the unit 216 is transmitted over the low rate 174 which connects the circuits 170 and 180. The processing unit 217 analyzes the phase information filtered by the filter 215. It can calculate the phase value from the argument of the complex value of its input signal. Moreover, it removes the rotation due to frequency offset from the value extracted by the unit 216 by removing the complex information generated with the frequency value provided by the unit 216. According to this operation, the phase signal extracted by the unit 217 has a bandwidth, which is narrower than the bandwidth of the filter 215 and can be expressed on the base band, as a scalar. The phase information extracted by the unit 217 is transmitted over the low rate lane 175, which connects the circuits 170 and 180.

The inter DSP unit 270 comprises the control unit 179, the clock source 178 and the digital buffers 176 and 177. The unit 270 exchanges information with the circuits 170 and 180. It also controls the rate of the lanes 174 and 175 with the clock source 178, as well as their timing with the buffers 176 and 177.

The processing unit 181 comprises the consecutive units 220, 221 222, 282 and 226. The ADC 220 digitalizes the analog outputs of the frontend 163. The unit 221 compensates in digital domain for the imperfections of the reception. The unit 222 compensates for the chromatic dispersion (CD) of the transmission through the MCF 150. It can perform compensation in frequency domain by frequency domain equalization (FDE). The unit 225 removes the frequency and phase information retrieved by the DSP 170 and provided to the DSP 180 through the low rate lanes 174 and 175. The unit 225 comprises the sub-units 223, 224 and 225. The unit 223 has function of voltage control oscillator (VCO). It generates a single frequency complex signal according to the frequency information provided by the lane 223. The unit 224 rotates the phase of the signal output by the VCO 223 by the phase amount provided by the low rate lane 175. The unit 225 removes the phase of the signal output by 224 from the signal output by the FDE unit 222. Considering the system of FIG. 1, the DSP 170 retrieves frequency and phase difference information between the received CW light and the unit 225 removes this information from the signal generated with the same CW light. Therefore, it compensates for frequency offset between the signal input into the frontend 163 and the LO 160. It also compensates for phase noise on lasers 140 and 160, within the bandwidth of the band pass filter 215. The output of the unit 225 is processed by the unit 226, which performs polarization de-multiplexing as well as carrier phase estimation according to direction-directed least mean square (DD-LMS) equalization. The output of the demodulation unit 181 is provided to the unit 182, which is composed of the sub-units 227, 228 and 229. The unit 227 performs decoding and decision, which the unit 228 performs soft decision FEC (SD-FEC). Information generated from the number of corrected error is provided for monitoring from the unit 228 to the control unit 179 of the inter DSP unit 270. The binary data stream 191 is generated by serializing or de-serializing by the unit 229 from the output of the FEC unit 228. The unit 282 comprises the units 223, 224 and 225.

Figure 3B:
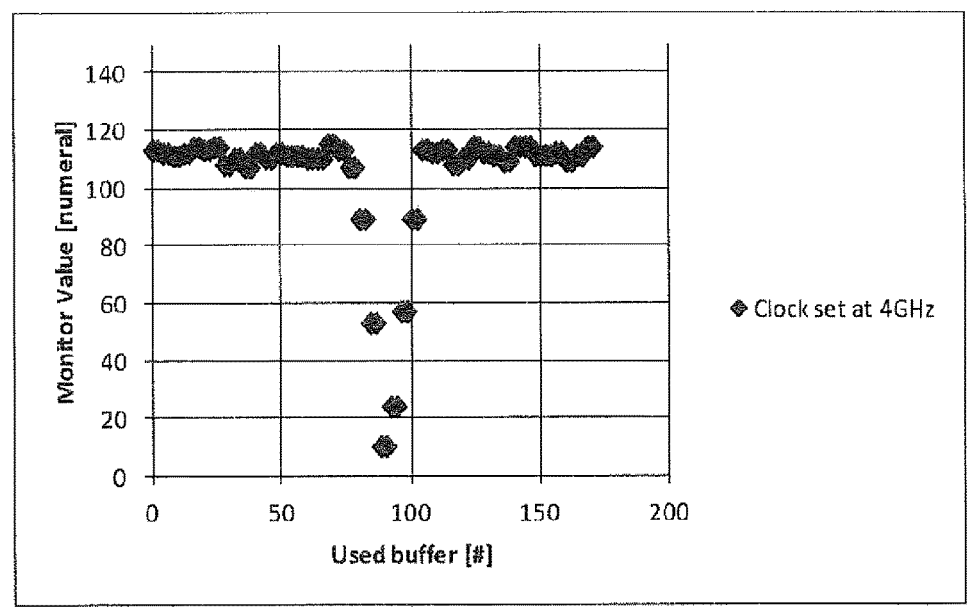
FIG. 3B is a monitor signal for various buffer settings at a clock of 4 GHz, according to an implementation of the invention.
Figure 3C:
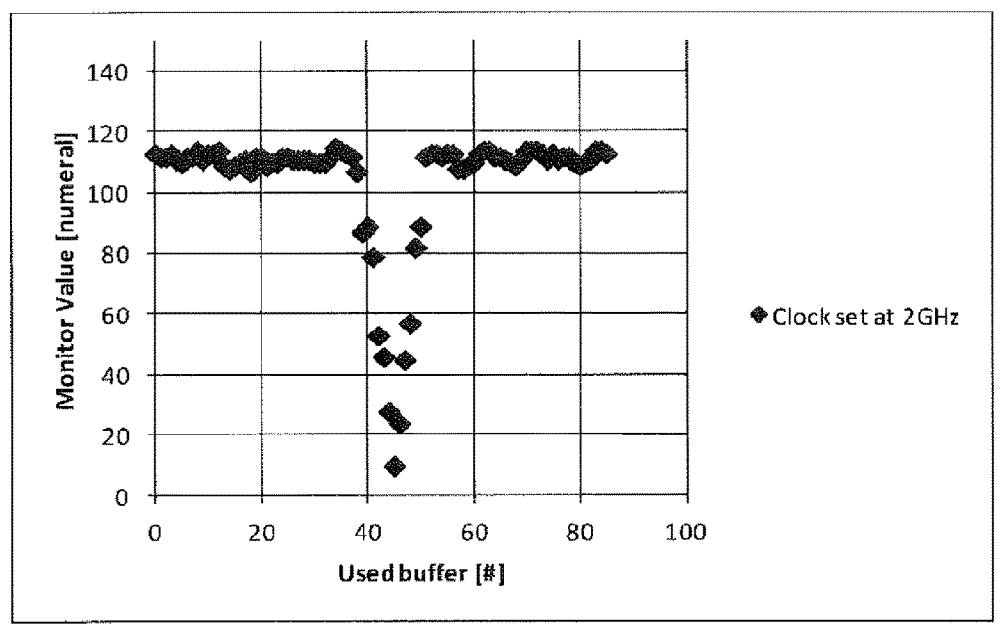
FIG. 3C is a monitor signal for various buffer settings at a clock of 2 GHz, according to an implementation of the invention.
Figure 3E:
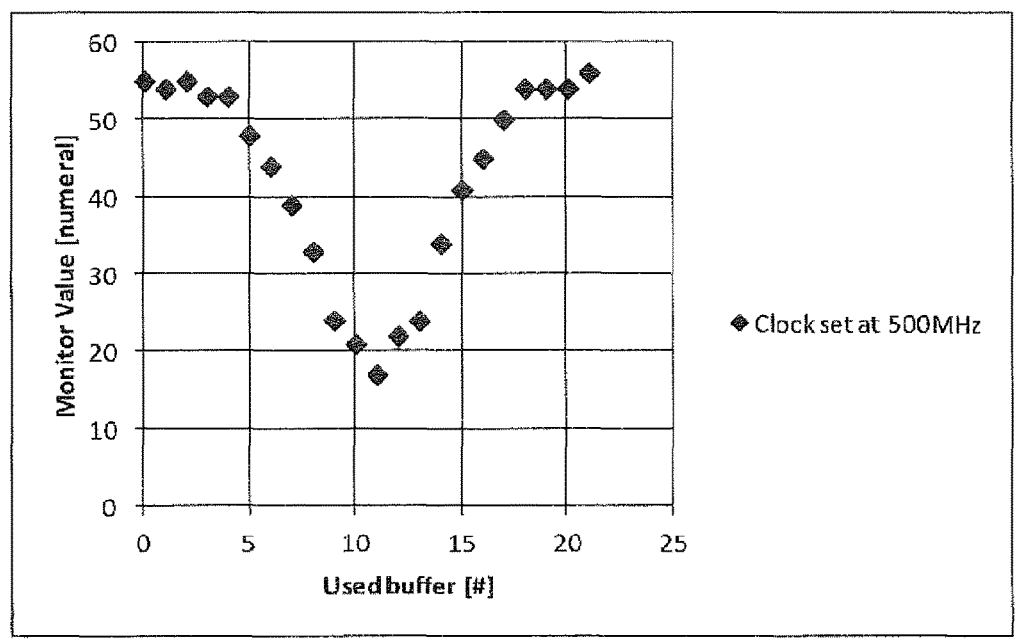
FIG. 3E is a monitor signal for various buffer settings at a clock of 500 MHz, according to an implementation of the invention.

FIG. 3 is a collection of simulations results for the system of FIG. 1. The graphs of FIG. 3 assume 112 Gb/s PM-16QAM modulation for the signal emitted by the stage 142 and 22.7 ns of skew between paths of the CW lightwave and the lightwave signal. They represent the monitor signal provided by the unit 182 to the control unit 179 plot against the number of bit shift by the buffers 176 and 177 according to the unit 179. According to FIG. 2, the monitor signal is generated according to the number of error corrected by the forward error correction of the unit 228. The buffers 176 and 177 are shift identically. Each graph represents a different clock rate of the generator 178 set by the control unit 179. For all cases, the bandwidth of the band pass filter 172 is set by the control unit 179 to half of said clock rate. FIG. 3A represents the case of a 14 GHz clock rate. The minimum monitor signal is reached for a shift of 315 symbols at 14 GHz. The area where the monitor signal decreases is limited to the narrow width of 100 symbols centered on said minimum. Apart from this area, the monitor signal is flat, which makes difficult the control of the buffer 176 and 177 according to the monitor signal. FIG. 3B and FIG. 3C represent respectively the cases of 4 GHz and 2 GHz clock rates. The respective minima are obtained for settings of 88 and 44 symbols. The shapes of the curves of FIG. 3B and FIG. 3C are comparable to the one of FIG. 3A. FIG. 3D represents the case of 1 GHz clock rate, where the minimum is reached for a setting of 22 symbols. FIG. 3E represents the case of 500 MHz, where the minimum is reached for a setting of 11 symbols. FIG. 3F represents the case of 200 MHz, where the minimum is reached for a setting of 4 symbols. FIG. 3G represents the case of 50 MHz rate, where the minimum is reached for the setting of 1 symbol. It is apparent that for 1 GHz and lower clock rate, the area where the monitor signal diminishes from the ceiling value becomes wider on constant time representation that is the product of the clock period by the number of shift symbols.

Figure 4:
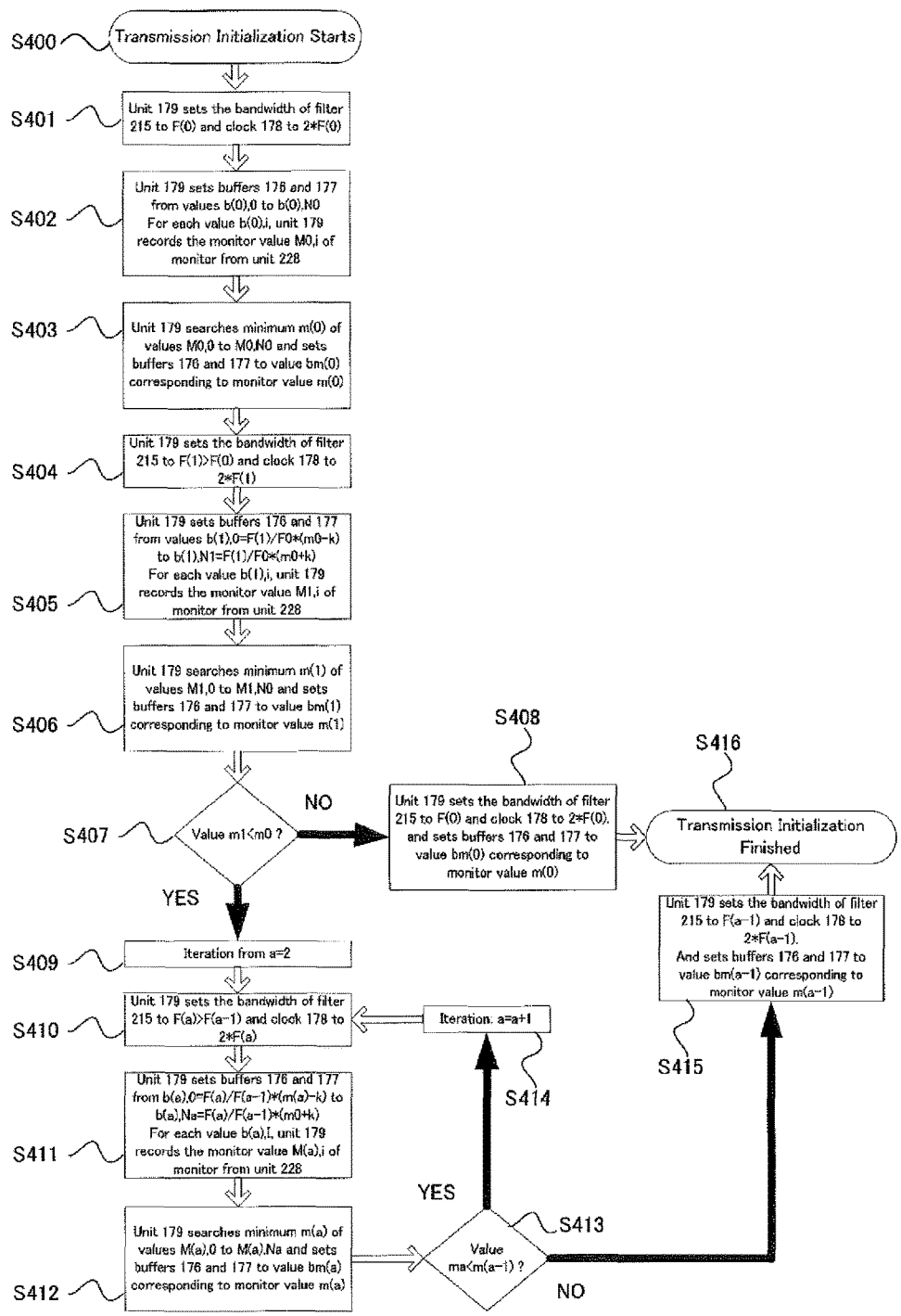
FIG. 4 is a schematic representation of a sequence used by an optical system using space division multiplexing according to an implementation of the invention.

FIG. 4 is a schematic representation of a sequence used by the system of FIG. 1. The sequence comprises the steps 400, 401, 402, 403, 404, 405, 406, 407, 408, 409, 410, 411, 412, 413, 414, 415 and 416.

Now, an example of operation of the system of FIG. 1 is given according to the sequence of FIG. 4. First, at step S400, the receiver corresponding to the DSP unit 180 starts initialization. Then, at step S401, the control unit 179 sets the clock rate of the generator 178 and the bandwidth of the filter 172 according to a bank of values stored in a lookup table. For example, the frequencies are noted from F(0) to F(5) and they are equal to F(0)=25 MHz, F(1)=100 MHz, F(2)=250 MHz, F(3)=500 MHz, F(4)=1 GHz, F(5)=2 GHz. The unit 179 first sets the rate of the clock 178 to 2*F(0) and the band pass filter 172 bandwidth to F(0), which can be considered as one embodiment of a first step of the process. Notably, the rate of the clock 178 is set proportionally to the bandwidth of the digital filter 172. At step S402, according to FIG. 3G, scanning the setting of the digital buffer over 0 to 3 symbol shifts enables to find the minimum of the monitor signal at the value 1. This can be understood as finding one embodiment of the optimum value in a consecutive second step of the process. At step S403, the minimum value and the corresponding buffer setting are stored by the control unit. At step S404, the unit 179 sets the rate of the clock 178 to 2*F(1) and the band pass filter 172 bandwidth to F(1). Notably, the rate of the clock 178 is set proportionally to the bandwidth of the digital filter 172. At step S405, according to FIG. 3F, scanning the setting of the digital buffer over 0 to 8 symbol shifts enables to find the minimum of the monitor signal at the value 4. The consecutive action of steps S404 and S405 can be understood as one embodiment of the third step of the process. At step S406, the minimum value and the corresponding buffer setting are stored by the control unit. At step S407, the minima for the settings F(0) and F(1) of the band pass filter 172 are compared, which can be understood as one embodiment of the fourth step of the process. The minimum for F(1) is lower than for F(0), therefore the process continues to step S409. In the contrary case, the control unit 179 would set the clock rate of the generator 178 to 50 MHz, the bandwidth of the band pass filter 172 to 25 MHz, the setting of the buffers 176 and 177 to 1 symbol period. At step S409, the pointer on the frequency bank stored in the control unit 179 is set to the index of 2.

At step S410, the unit 179 sets the bandwidth of the filter 172 to F(2) and the rate of the clock generator 178 to 2*F(2). Notably, the rate of the clock 178 is set proportionally to the bandwidth of the digital filter 172. At step S411, according to FIG. 3E, scanning the setting of the digital buffer over 8 to 14 symbol shifts enables to find the minimum of the monitor signal at the value 11. At step S412, the minimum value and the corresponding buffer setting are stored by the control unit. At step S413, the minima for the settings F(1) and F(2) of the band pass filter 172 are compared. The minimum for the case of F(2) is lower than the minimum of the case of F(1), therefore the process continues to step S414, where the index on the bank of frequencies is iterated to 3 and back to step S410.

At step S410, the unit 179 sets the bandwidth of the filter 172 to F(3) and the rate of the clock generator 178 to 2*F(3). Notably, the rate of the clock 178 is set proportionally to the bandwidth of the digital filter 172. At step S411, according to FIG. 3D, scanning the setting of the digital buffer over 20 to 24 symbol shifts enables to find the minimum of the monitor signal at the value 22. At step S412, the minimum value and the corresponding buffer setting are stored by the control unit. At step S413, the minima for the settings F(2) and F(3) of the band pass filter 172 are compared. The minimum for the case of F(3) is lower than the minimum of the case of F(2), therefore the process continues to step S414, where the index on the bank of frequencies is iterated to 4.

At step S410, the unit 179 sets the bandwidth of the filter 172 to F(4) and the rate of the clock generator 178 to 2*F(4). Notably, the rate of the clock 178 is set proportionally to the bandwidth of the digital filter 172. At step S411, according to FIG. 3C, scanning the setting of the digital buffer over 42 to 46 symbol shifts enables to find the minimum of the monitor signal at the value 44.

At step S412, the minimum value and the corresponding buffer setting are stored by the control unit. At step S413, the minima for the settings F(3) and F(4) of the band pass filter 172 are compared. The minimum for the case of F(4) is lower than the minimum of the case of F(3), therefore the process continues to step S414, where the index on the bank of frequencies is iterated to 5.

At step S410, the unit 179 sets the bandwidth of the filter 172 to F(5) and the rate of the clock generator 178 to 2*F(5). Notably, the rate of the clock 178 is set proportionally to the bandwidth of the digital filter 172. At step S411, according to FIG. 3D, scanning the setting of the digital buffer over 86 to 90 symbol shifts enables to find the minimum of the monitor signal at the value 88. At step S412, the minimum value and the corresponding buffer setting are stored by the control unit. At step S413, the minima for the settings F(4) and F(5) of the band pass filter 172 are compared. The minimum for the case of F(5) is not lower than the minimum of the case of F(4), therefore the process continues to step S415. The repetition of the actions of the steps S410 to S414 can be understood as one embodiment of the fifth step of the process. At the step S415, the control unit 179 sets the bandwidth of the filter 172 to 1 GHz and the rate of the clock generator 178 to 2 GHz. The control unit sets the buffers 176 and 177 to a 44 symbol period shifts. After the completion of step S415, the initialization of the system is complete. The timing between the DSP 170 and 180 is optimally set and data received with the DSP 180 can be demodulated with the advantages of the information retrieved by the DSP 170.

According to the shared carrier reception method used in the system of FIG. 1, the characteristics of the signal received by the DSP 180 is improved in virtue of compensation of phase noise. The value of the band pass filter is optimal and the timing between the DSP 170 and 180 is optimal, independently of the skew between cores C01 and C02 of the MCF 150. The communication between the DSP 170 and 180 is performed at optimal clock rate. The clock rate obtained by the process of FIG. 4 enables efficient compensation of phase noise according to the shared carrier reception and is lower than the symbol rate. Higher clock rates, such as clock rates equal to the symbol rate, such as illustrated on FIG. 3A are not required. Moreover, the maximum required buffer for adjustment is reduced by virtue of reduction of the clock rate. This also reduces power consumption of the receiver 102 and simplifies implementation. Furthermore, the optimal settings could be found with only 29 steps, whereas blind scanning would require fine scanning with deep buffer reserve in the range of 600 symbol periods. The benefits of the invention grow with the skew between C01 and C02, which means also with the transmission distance.

According to another implementation of the invention, after the step S416 of FIG. 4 is reached, the bandwidth of the filter 172 is fixed to the value set at step S415 or step S408 depending on the results of the test on the extrema of the process. After the initialization process is finished, according to the completion of said fifth step of the process, the control unit 179 continuously sets the buffers 176 and 177 so that the monitor provided by sub elements of the DSP 180 to the control unit 179 becomes optimal, according to one embodiment of the sixth step of the process. This process can be performed by dithering the quantity of buffers 176 and 177. The bandwidth of the filter 172 is kept constant at the value set at step S415, according to one embodiment of the seventh step of the process. This enables to compensate for variations of the timing between the light waves travelling through cores C01 and C02 of the MCF 150, which is susceptible to appear in service.

According to the shared carrier reception method used in the system of FIG. 1, the characteristics of the signal received by the DSP 180 is improved in virtue of compensation of phase noise. The timing between the DSP 170 and 180 is optimal and is kept in optimal value in service of the system, independently of the skew between cores C01 and C02 of the MCF 150.

According to another implementation of the invention, the resource of the digital buffers 176 and 177 is limited to 32 clock periods. The system of FIG. 1 is initialized according to a procedure such as the one depicted on FIG. 4. The process of FIG. 4 applied to the simulated data of FIG. 3 leads to the case, where the clock rate of the generator 178 is set to 2*F(3)=1 GHz and the optimal buffer setting is found at a buffer setting of 22 clock periods. According to the comparison of the minima of the monitor at F(3) and at F(2), the monitor is lower for F(3), therefore the procedure continues to the next frequency in the bank, F(4). However, proceeding to F(4) divides the clock rate of the generator 178 by 2, and therefore the center of the buffer scanning range would be 44 clock periods. However, this value is outside buffer resource, therefore the initialization process of the system stops at a clock rate of 2*F(3) and an optimal buffer setting of 22 clock periods.

According to the shared carrier reception method used in the system of FIG. 1, the characteristics of the signal received by the DSP 180 is improved in virtue of compensation of phase noise. The timing between the DSP 170 and 180 is optimal and the improvement in received signal characteristics is optimal within the range of the buffer resource of the receiver 102.

According to another implementation of the invention, the transmitter of FIG. 1 emitting the individual lightwave signal transmitted through the core C02 and the receiver receiving said lightwave signal are reconfigurable. The initialization process of FIG. 4 is performed with the circuit 143, the modulation stage 142, and the DSP 180 configured to transmit and receive 112 Gb/s PM-16QAM. After the transmission has started, the system is reconfigured to improve the system performance and the circuit 143, the stage 142 and the DSP 180 are reconfigured in service to transmit and receive 112 Gb/s PM-8QAM signal, according to setting from the network control layer. This means that the DSP units 226 and 227 of FIG. 2 are reconfigured for the new modulation format. This also means that the symbol rate and therefore the clock rate of the DSP 180 are reconfigured.

According to the invention, the information provided by the DSP 170 to the DSP 180, as well as the adjusted timing does not need to be reconfigured or reinitialized, although the DSP 180 was reconfigured. This means that the improvement in signal quality obtained by phase noise compensation or frequency offset compensation can be preserved when the received signal is reconfigured and that the reconfiguration stage is not made longer by the usage of the information of DSP 170 in the DSP 180.

Second Description of Embodiments

Figure 5:
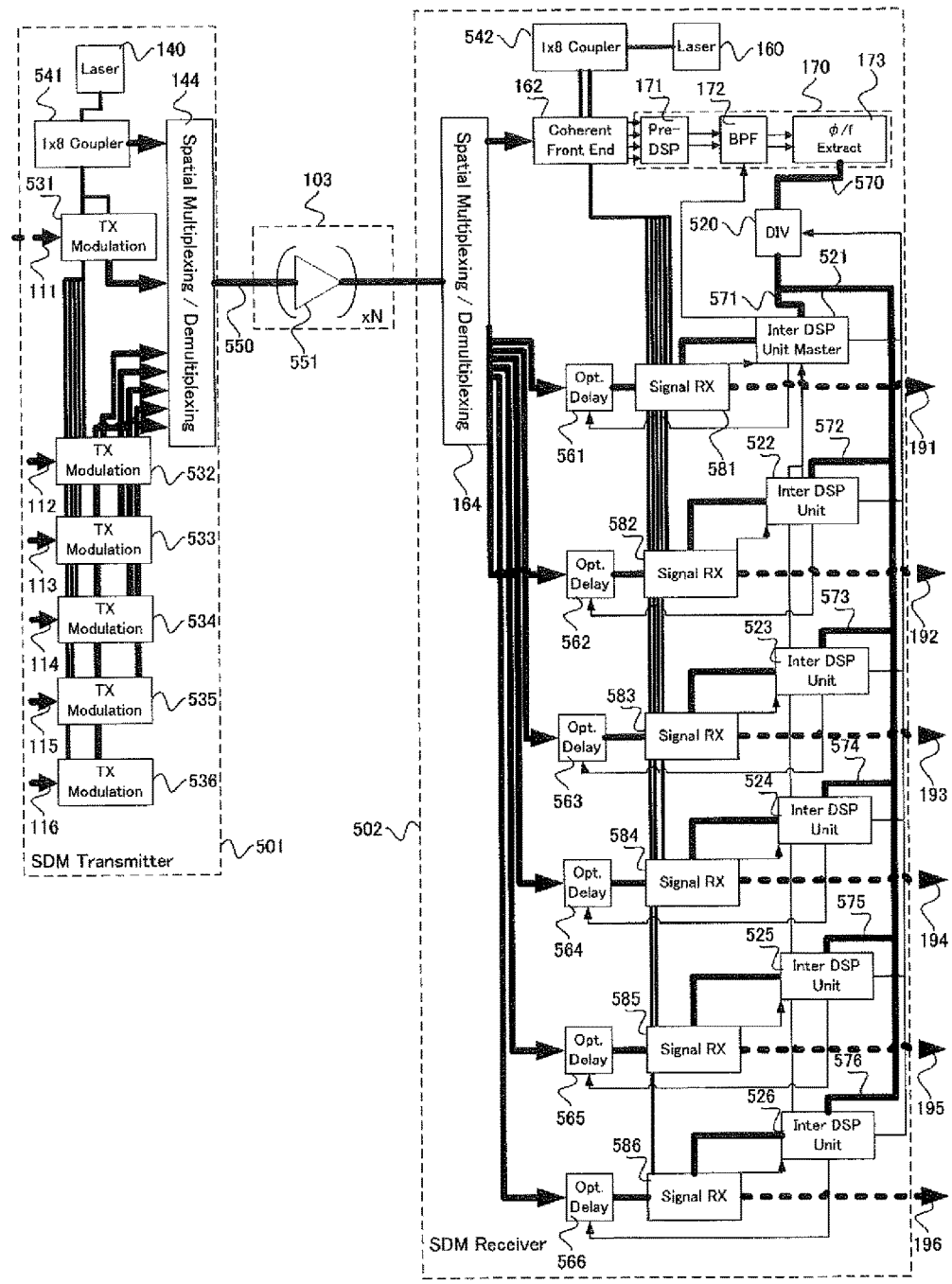
FIG. 5 is a schematic representation of an optical system, using space division multiplexing, transmitting and receiving optical signals according to a second exemplary embodiment of the invention.

FIG. 5 is a schematic representation of an optical system including an optical transmitter 501, which uses SDM, an optical receiver 502, which uses SDM and a transmission line 103, which uses MCF. The elements denoted with the numerals 103, 111 to 116, 140, 144, 160, 162, 164, 170 to 173, and 191 to 196 are described on FIG. 1. The transmitter 501 and the receiver 502 are communicating through the line 103, which is composed of N spans of multicore fiber 550, with 7 cores, with multicore amplification 551 at each span. Higher or lower core count can be used, provided that the fiber 550, amplifier 551, transmitter 501 and receiver 502 are equipped accordingly to the number of cores.

The transmitter 501 is fed with 6 binary data lanes denoted with the numerals 111 to 116, which are used to modulate six respective lightwave signals according to the respective transmitters 531, 532, 533, 534, 535 and 536. The six lightwave signals are spatially multiplexed with the multiplexer 144 and are launched in 6 cores of the MCF. The transmitters 531 to 536 are identical and composed of an integrated circuit identical to the circuit 143 and a modulation stage identical to the stage 142. The light modulated by the transmitters 531 to 536 is provided by a laser 140, which output is split by the polarization maintaining 1×8 coupler denoted with 541. One of the outputs of the coupler 514 is unused and terminated. Another output of the coupler 541 is not modulated and is multiplexed by the spatial multiplexer 144 to be launched into one core of the MCF 550.

The receiver 502 comprises a spatial de-multiplexer 164, which de-multiplexes the output of the MCF 550 into 7 lightwave signals. After de-multiplexing with the de-multiplexer 164, the un-modulated lightwave provided by one output of the coupler 541 is fed to the coherent frontend 162; similarly, the lightwave provided by the transmitter 531 is fed to the element 561, which enables to adjust the optical delay, after demodulation; identically, the respective light waves provided by the respective transmitters 532, 533, 534, 535 and 536 are fed to the respective elements 562, 563, 564, 565 and 565, which enables to adjust the optical delay, after demodulation. The elements 561 to 566 can be realized with variable optical delay lines. Alternatively, the elements 561 to 566 can be realized with optical switching between optical paths with different lengths. The respective optical outputs of the respective delay elements 561, 562, 563, 564, 565 and 566 are fed to the respective receivers 581, 582, 583, 584, 585 and 586, which demodulate their respective input signal and generate accordingly the respective binary output streams 191, 192, 193, 194, 195 and 196. The receivers 581 to 586 are composed of a coherent frontend identical to 163 and a DSP identical to 180, which demodulates the input signal and uses the information provided by the DSP 170 to improved the demodulated signal quality, and generate a monitor signal reflecting the quality of the demodulated signal. The frontend 162 as well as the frontends of the receivers 581 to 586 use a LO provided by the same laser 160, which output is split by the 1×8 PM coupler 542. One output of the coupler 542 is unused and terminated. The DSP 170, which is composed of the consecutive digital signal processing units 171, 172 and 173, which retries information on the frequency offset and phase difference between the LO 160 and the received CW light. The information on frequency and phase are output through the low speed data lane denoted 570, which comprises two sub-lanes identical to the respective lanes 174 and 175. The lane 570 is split into 6 identical low speed data lanes denoted 571, 572, 573, 574, 575 and 576 by the divider 520.

Identically to 570, each of the lanes 571 to 576 is composed of two sub-lanes, identical to the respective lanes 174 and 175, containing information on frequency and phase extracted by the processing unit 173. The respective data lanes 571, 572, 573, 573, 574, 575 and 576 pass through the respective inter DSP circuits 521, 522, 523, 524, 525 and 526. The inter DSP circuits 521 to 526 are similar to the circuit 270 described on FIG. 2. They comprise a control unit receiving monitor signal and controlling other elements, including a low frequency clock rate which control the rate of the data sub-lanes, buffers units on the low rate data sub-lanes. The rate of the data sub-lanes of the respective lanes 571, 572, 573, 574, 575 and 576 can be set by the respective inter DSP units 521, 522, 523, 524, 525 and 526 using the dividing element 520 to control the rate of its outputs. The respective receiver 581, 582, 583, 584, 585 and 586 generate respective monitors depending on the quality of the received signal, which are provided to the control units of the respective inter DSP units 521, 522, 523, 524, 525 and 526. The bandwidth of the band pass filter 172 is controlled by the control unit of the inter DSP unit 521. Other inter DSP units 522 to 526 may set the bandwidth of the filter 172 by communication of their respective control unit to the control unit of the unit 521. The control units of the respective inter DSP units 521, 522, 523, 524, 525 and 526 control the optical delay set by the respective optical delay elements 561, 562, 563, 564, 565 and 566.

The buffer of the inter DSP circuits 521 to 526 are adjusted synchronously with the same method as the process of FIG. 4. After initialization of the system of FIG. 5, the timing between DSP can be adjusted in service independently for the DSP of the receivers 581 to 586. Furthermore, the control units of the inter DSP units 571 to 576 can offload or control one part of their internal buffer as optical delay by setting the optical delays 561 to 566.

According to the shared carrier reception method used in the system of FIG. 5, the characteristics of the signal received by the DSP of the receivers 581, 582, 583, 584, 585 and 586 is improved in virtue of compensation of phase noise. The value of the band pass filter is optimal and the timing between the DSP 170 and the DSP of the receivers 581 to 586 is optimal, independently of the skew between cores of the MCF 550. The communication between DSP is performed at optimal clock rate. Moreover, the maximum required buffer for adjustment is reduced by virtue of reduction of the clock rate. This reduces power consumption of the receiver 502 and simplifies implementation. Furthermore, by combination of digital buffer and optical delay, the invention presents versatile and fast adaptive setting of timing through low rate digital buffer between DSP as well as even lower power consumption by setting of delay in the optical domain and offloading one part of the digital buffer delay to optical delay.

Third Description of Embodiments

Figure 6:
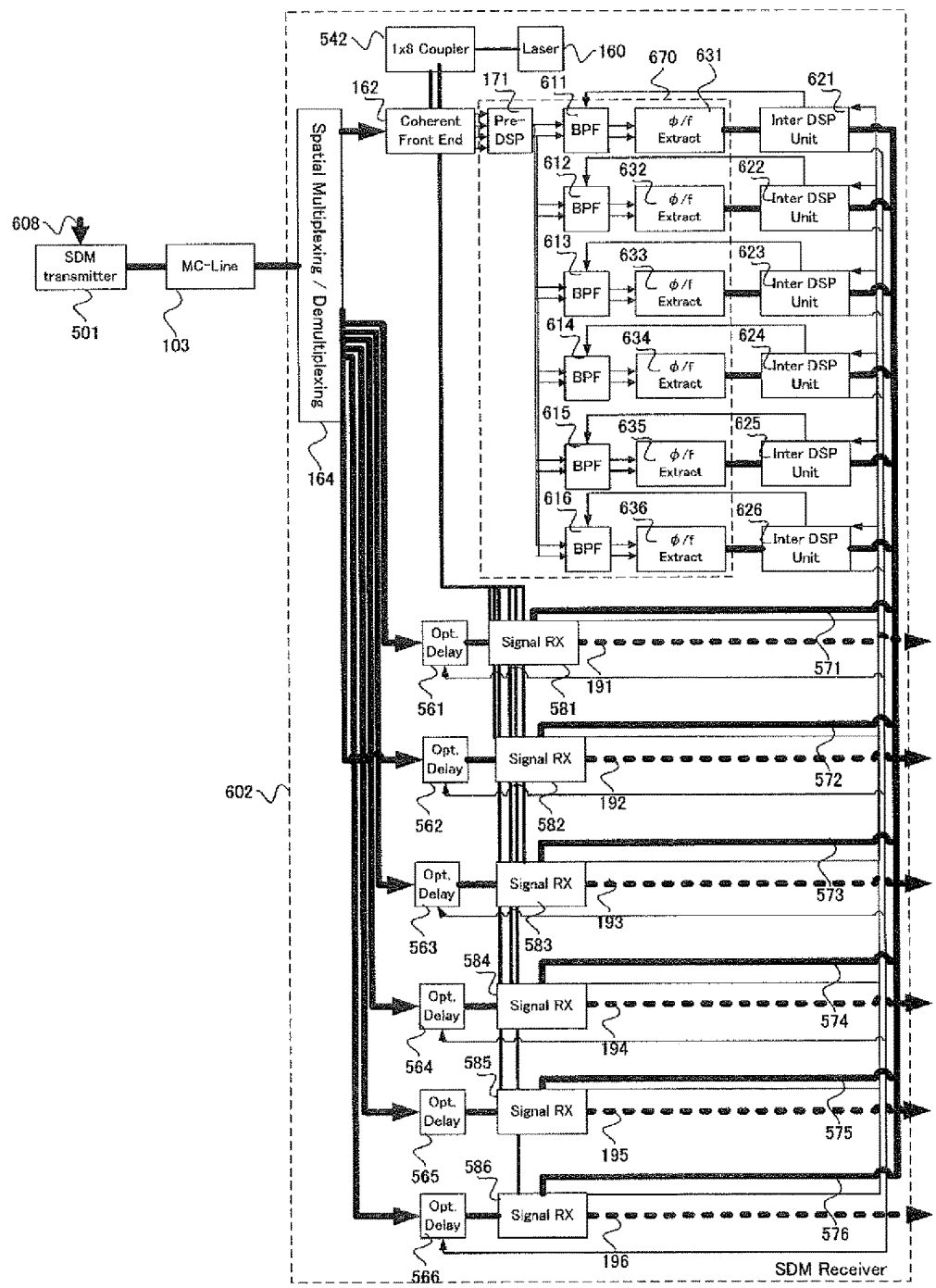
FIG. 6 is a schematic representation of an optical system, using space division multiplexing, transmitting and receiving optical signals according to a third exemplary embodiment of the invention.

FIG. 6 is a schematic representation of an optical system including an optical transmitter 501, which uses SDM, an optical receiver 602, which uses SDM and a transmission line 103, which uses MCF. The elements denoted with the numerals 103, 160, 162, 164, 171, and 191 to 196 are described on FIG. 1. The elements denoted with the numerals 501, 542, 561 to 566, 571 to 576, and 581 to 586 are described on FIG. 5. The transmitter 501 and the receiver 602 are communicating through the line 103, which is composed of N spans of multicore fiber with 7 cores, with multicore amplification at each span. Higher or lower core count can be used, provided that the fiber, amplifier, transmitter 501 and receiver 602 are equipped accordingly to the number of cores.

The transmitter 501 is fed with the binary data stream 608 which consists in 6 tributary binary data lanes similar to the lanes 111 to 116 of FIG. 1. The output of the transmitter 501 consists of six lightwave signals modulated according to tributaries of bit stream 608 and spatially multiplexed with a non-modulated lightwave. All spatially multiplexed light waves are generated from an identical laser. The spatially multiplexed signals are launched in the multicore transmission line 103.

The receiver 602 comprises a spatial de-multiplexer 164, which de-multiplexes the output of the MCF into 7 lightwave signals. After de-multiplexing with the de-multiplexer 164, the un-modulated lightwave from 501 is fed to the coherent frontend 162; the other six modulated lightwave signals are de-multiplexed with the de-multiplexer 164 and fed to the delay elements 561 to 566. The electrical outputs of the frontend 162 are processed by the DSP 670. The DSP 670 comprises a first processing unit 171. The output of the unit 171 is split into 6 parallel and identical signals, which are respectively fed to the processing units 611, 612, 613, 614, 615 and 616. The units 611 to 616 are band pass filter processing units, which are similar to the unit 172. The filter output of the unit 611 is fed to the processing unit 631, which is similar to the unit 173 and extracts information on phase and frequency difference between the LO from the laser 160 and the input non-modulated lightwave. The information on phase and frequency is output from the unit 631 into the low rate data lane 571. Identically, the output of the respective filters 612, 613, 614, 615 and 616 are processed by the respective units 632, 633, 634, 635 and 636. The respective processing units 632, 633, 634, 635 and 636 are also identical to the unit 173 and also extract information on the phase and frequency of the input un-modulated lightwave, which is output onto the respective low rate data lanes 572, 573, 574, 575 and 576. The respective inter DSP units 621, 622, 623, 624, 625 and 626 are placed on the respective low rate data lanes 571, 572, 573, 574, 575 and 576. The inter DSP units 621 to 626 are identical to the unit 270 of FIG. 2. They control the timing and clock rate of the low speed data lanes and are respectively placed on. The respective units 621, 622, 623, 624, 625 and 626 control the bandwidth of the respective band pass filters 611, 612, 613, 614, 615 and 615, and they receive a monitor based on the signal quality from the respective receivers 581, 582, 583, 583, 584, 585 and 586.

The buffer of the inter DSP circuits 621 to 626 are adjusted independently with the same method as the process of FIG. 4. After initialization of the system of FIG. 6, the timing between DSP can be adjusted in service independently for the DSP of the receivers 581 to 586. Furthermore, the control units of the inter DSP units 671 to 676 can offload or control one part of their internal buffer as optical delay by setting the optical delays 561 to 566.

According to the shared carrier reception method used in the system of FIG. 6, the characteristics of the signal received by the DSP of the receivers 681, 682, 683, 684, 685 and 686 is improved in virtue of compensation of phase noise. The value of the band pass filter is optimal and the timing between the DSP 170 and the DSP of the receivers 681 to 686 is optimal, independently of the skew between cores of the multicore transmission line 103. The communication between DSP is performed at optimal clock rate. Moreover, the maximum required buffer for adjustment is reduced by virtue of reduction of the clock rate. This reduces power consumption of the receiver 602 and simplifies implementation. Furthermore, by combination of digital buffer and optical delay, the invention presents versatile and fast adaptive setting of timing through low rate digital buffer between DSP as well as even lower power consumption by setting of delay in the optical domain and offloading one part of the digital buffer delay to optical delay.

In another implementation of the invention, the core C01 of the MCF 150 of the multicore line 103 carries the un-modulated lightwave carrier and the other cores C02, C03, C04, C05, C06 and C07 carry lightwave modulated according to tributaries of the data stream 608. The index of refraction of the core C01 is set 0.1% higher than the ones of the cores C02 to C07. Considering a length of 1000 km for the line 103, the un-modulated lightwave arrives to the frontend 162 with 5.2 ms of additional delay compared to the modulated lightwave signals arriving to the receivers 581 to 586. In that case, the optical delay elements 561 to 566 and the digital buffers inside the inter DSP units 621 to 626 must be set to reduce the delay of the un-modulated lightwave, which means that the buffers must use less symbols period delays and the delay elements must be set to longer paths. This enable to determine the direction, on which the delay must be adjusted and therefore to reduce by half the number of steps necessary to initialize the system of FIG. 6 according to the procedure of FIG. 4.

In an alternative implementation of the invention, the core C01 of the MCF 150 of the multicore line 103 carries the un-modulated lightwave carrier and the other cores C02, C03, C04, C05, C06 and C07 carry lightwave modulated according to tributaries of the data stream 608. The index of refraction of the core C01 is set 0.1% less than the ones of the cores C02 to C07. Considering a length of 1000 km for the line 103, the modulated lightwave signals arriving to the receivers 581 to 586 arrive with 5.2 ms of additional delay compared to the un-modulated lightwave to the frontend 162. In that case, the optical delay elements 561 to 566 and the digital buffers inside the inter DSP units 621 to 626 must be set to augment the delay of the un-modulated lightwave, which means that the buffers must use more symbols period delays and the delay elements must be set to shorter paths. This enable to determine the direction, on which the delay must be adjusted and therefore to reduce by half the number of steps necessary to initialize the system of FIG. 6 according to the procedure of FIG. 4.

According to another implementation of the invention, the resource of the digital buffers of the inter DSP 621 to 626 limited to 32 clock periods per low rate sub-lane. The receiver 581 and the inter DSP 621 units of the system of FIG. 6 is initialized according to a procedure such as the one depicted on FIG. 4. The process of FIG. 4 applied to the simulated data of FIG. 3 leads to the case, where the clock rate of the generator of is set to 2*F(3)=1 GHz and the optimal buffer setting is found at a buffer setting of 22 clock periods. According to the comparison of the minima of the monitor at F(3) and at F(2), the monitor is lower for F(3), therefore the procedure continues to the next frequency in the bank, F(4). However, proceeding to F(4) divides the clock rate of the generator of the inter-DSP unit 621 by 2, and therefore the center of the buffer scanning range would be 44 clock periods. However, this value is outside buffer resource, therefore the initialization process of the system stops at a clock rate of 2*F(3) and an optimal buffer setting of 22 clock periods.

According to the shared carrier reception method used in the system of FIG. 1, the characteristics of the signal received by the DSP 581 is improved in virtue of compensation of phase noise. The timing between the DSP 581 and 670 is optimal and the improvement in received signal characteristics is optimal within the range of the buffer resource of the receiver 602.

According to another implementation of the invention, the resource of the digital buffers of the inter DSP 621 to 626 limited to 32 clock periods per low rate sub-lane. The receiver 581 and the inter DSP 621 units of the system of FIG. 6 is initialized according to a procedure such as the one depicted on FIG. 4. The process of FIG. 4 applied to the simulated data of FIG. 3 leads to the case, where the clock rate of the generator of is set to 2*F(3)=1 GHz and the optimal buffer setting is found at a buffer setting of 22 clock periods. According to the comparison of the minima of the monitor at F(3) and at F(2), the monitor is lower for F(3), therefore the procedure continues to the next frequency in the bank, F(4). However, proceeding to F(4) divides the clock rate of the generator of the inter-DSP unit 621 by 2, and therefore the center of the buffer scanning range would be 44 clock periods. However, this value is outside buffer resource, therefore the initialization process of the system stops at a clock rate of 2*F(3) and an optimal buffer setting of 22 clock periods.

According to the shared carrier reception method used in the system of FIG. 6, the characteristics of the signal received by the DSP 581 is improved in virtue of compensation of phase noise. The timing between the DSP 581 and 670 is optimal and the improvement in received signal characteristics is optimal within the range of the buffer resource of the receiver 602.

According to another implementation of the invention, the resource of the digital buffers of the inter DSP 621 to 626 limited to 32 clock periods per low rate sub-lane. The receiver 581 and the inter DSP 621 units of the system of FIG. 6 is initialized according to a procedure such as the one depicted on FIG. 4. The process of FIG. 4 applied to the simulated data of FIG. 3 leads to the case, where the clock rate of the generator of is set to 2*F(3)=1 GHz and the optimal buffer setting is found at a buffer setting of 22 clock periods. According to the comparison of the minima of the monitor at F(3) and at F(2), the monitor is lower for F(3), therefore the procedure continues to the next frequency in the bank, F(4). However, proceeding to F(4) divides the clock rate of the generator of the inter-DSP unit 621 by 2, and therefore the center of the buffer scanning range would be 44 clock periods. However, this value is outside buffer resource, therefore the optical delay element 561 is set so that the delay it causes is reduced by the equivalent of 15 low rate clock periods at a rate of 2*F(3). The low rate clock of the unit 621 is then set to 2*F(4) and the center of the scanning range of the digital buffer is set to 14. The optimal is found at 14 buffers. Setting the low clock frequency to 2*F(5) gives no longer improvement in the minimum of the monitor, therefore the optimal setting of clock rate at 2*F(4) and 14 buffer is found.

According to the shared carrier reception method used in the system of FIG. 6, the characteristics of the signal received by the DSP 581 is improved in virtue of compensation of phase noise. The timing between the DSP 581 and 670 is optimal and the improvement in received signal characteristics is optimal in virtue of the use of the optical buffer within the receiver 602.

FIG. 7 is a schematic representation of receivers which can be used in of FIG. 1, 5 or 6, which are used to receive and process un-modulated lightwave and lightwave signals. The elements denoted with the numerals from 160 to 163, 170, 174 to 179, 182 and 191 are described on FIG. 1. The elements denoted with the numerals from 220 to 222, 270 and 282 are described on FIG. 2.

The processing unit 780 comprises the units 781, which comprises the consecutive 220, 221 222, 726, 282 and 727, the unit 182 and the monitoring circuit composed of the units 728, 729 and 730. The unit 726 performs polarization de-multiplexing based on the multiple module algorithm, which can de-multiplex polarizations of QAM signal. Frequency offset compensation and phase noise compensation are performed with the processing unit 282. An additional unit 727 rotates the constellation to remove residual phase difference between the un-modulated lightwave fed to the frontend 162 and the lightwave signal fed to the frontend 163. The unit 727 can be based on the $4^{th}$ power algorithm on the four outer symbol of QAM constellation after decision. The information of the process operated by the unit 727 is transmitted to the monitor unit 728, which retrieves the angle rotation performed by the unit 727. The band pass filter 729 filters the information retrieved by the unit 728. The bandwidth of the filter 729 is set by the control unit 179 according to the set value of the band pass filter 172 of the DSP 170. The unit 730 monitors the power of the signal within the bandwidth of the filter 730. The output of the monitor 730 is provided to the control unit 179 to be used as monitor signal. Indeed, residual phase noise in the bandwidth of the filter 729 can be used to indicate the signal quality inside the process of FIG. 4. Notably, the monitor signal is generated according to the power of a tapped portion of monitor of the phase rotation information of the signal of the destination channel. Furthermore, the information on phase rotation is comprised in a bandwidth set equal to the value of the bandwidth of the digital filter 172 of the CW DSP unit 170 by the control unit 179.

According to the monitor signal of FIG. 7, the monitor signal provided by the DSP 780 to the control unit 270 can be updated at faster rate than FEC generated signal and with less latency. Therefore, it enables faster monitoring and correction of skew between multiplexed signals and un-modulated lightwave for the systems of FIGS. 1, 5 and 6.

FIG. 8 is an additional simulation result for the system of FIG. 1 with 112 Gb/s PM-16QAM modulation for the lightwave signal and 4.5 ms of skew between the un-modulated lightwave and the lightwave signal. It represents the monitor signal provided by the unit 182 to the control unit 179 plot against the number of bit shift by the buffers 176 and 177 according to the unit 179 for a frequency of 2 MHz for the clock rate of the low rate lanes 174 and 175 and a bandwidth of 1 MHz for the filter 172. Ultra-narrow setting of the bandwidth of the filter 172 enables to first isolate a skew interval, on which the demodulation of the received signal is possible. Applying the process of FIG. 4 after scanning with ultra-narrow setting of bandwidth enables to first isolate an interval, on which demodulation is possible when the frequency offset between the lightwave used in the transmitter and the LO is high as well as the skew between cores a MCF is high. Additionally, usage of a combination of optical delay elements and digital buffer enables to reduce the necessary resource in digital buffer.

Fourth Description of Embodiments

Figure 9:
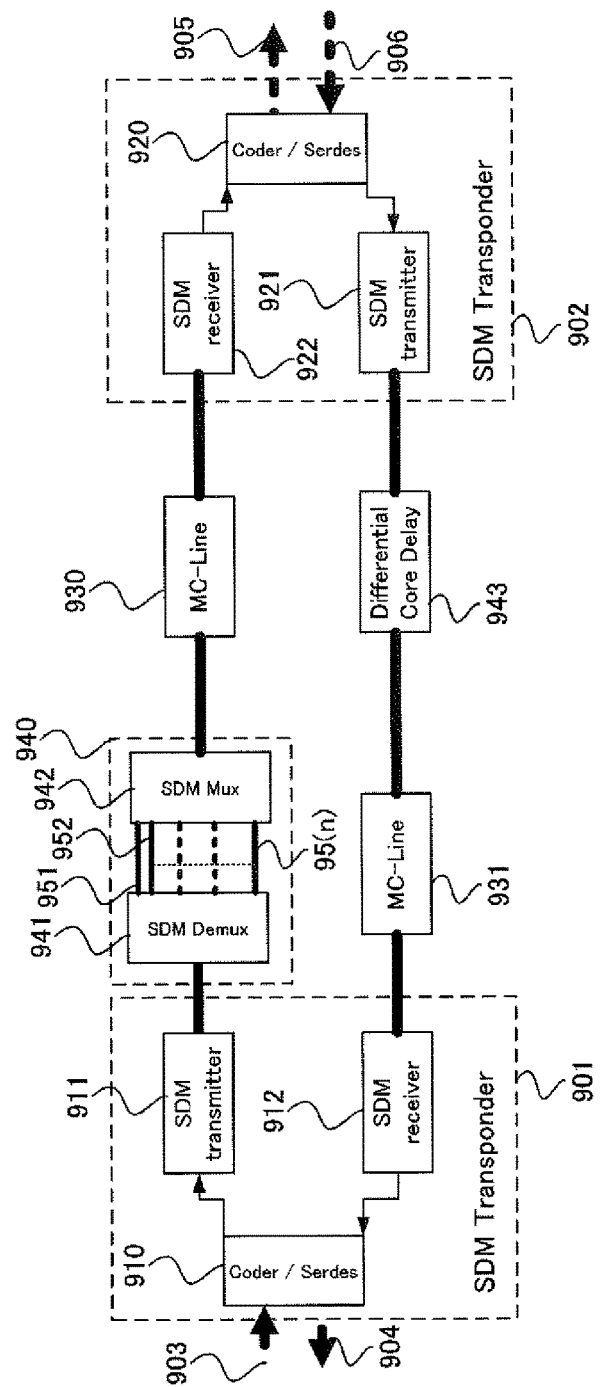
FIG. 9 is a schematic representation of an optical system, using space division multiplexing, transmitting and receiving optical signals according to a fourth exemplary embodiment of the invention.

FIG. 9 is a schematic representation of an optical system including two optical transponders 901 and 902, which uses SDM and transmission lines 930 and 931, which uses MCF and MC-EDFA. The multicore transmission lines 930 and 931 are similar to the line 103. The SDM transponder 901 comprises a transmitter 911 and a receiver 912 using SDM. The transmitter 911 can be identical to the transmitters 101 or 501. The receiver 912 can be identical to the receivers 102, 502 or 602. The transponder 901 transmits SDM signal, which is modulated by the SDM transmitter 911 according to tributaries of the data bit stream 903 through the line 930. The receiver 912 of the transponder 901 receives lightwave emitted by the transponder 902 through the line 931 and generates a data bit stream 904 accordingly to the demodulated data. The circuit 910 performs serializing, de-serializing, coding and decoding of the streams 903 and 904. The transponder 902 is identical to the transponder 901 and contains the transmitter 921, identical to the transponder 911, and the receiver 922, identical to the receiver 922. The transponder 902 emits lightwave into the multicore line 931, which are modulated according to tributaries of the data bit stream 906. The transponder 902 receives lightwave signal from the line 930 and generates the data bit stream 905 according to the data demodulated by the receiver 922. The circuit 920 performs serializing, de-serializing, coding and decoding of the streams 905 and 906, identically to the circuit 910.

The differential core delay elements 940 and 943 are identical. The element 940 is inserted between the transponder 901 and the line 930. The element 943 is inserted between the transponder 902 and the line 931. The element 940 is realized with a spatial de-multiplexer 941 and a spatial multiplexer 942. Between the multiplexer 941 and the de-multiplexer 942, single core fiber with different lengths, denoted with the numerals 951, 952 to 95(n) are provided to transmit the n lightwave signals spatially multiplexed and transmitted through the n core MCF of the line 930.

In an implementation of the invention, the transmitter 911 emits (n−1) lightwave signals and one un-modulated lightwave generated from the same laser. The un-modulated lightwave is transmitted in the core denoted with the numeral 1 of the MCF used in the line 930. The single core fiber 951 of the delay element 940 is designed for instance longer than the n−1 other single core fibers 952 to 95(n), so that un-modulated lightwave is delayed by 10 ms. In that case, the (n−1) optical delay elements identical to the elements 561 to 566 of FIG. 6, which are comprised in the receiver 922 and the digital buffers inside the inter DSP units identical to the units 621 to 626 of FIG. 6, which are comprised in the receiver 922 must be set to reduce the delay of the un-modulated lightwave; this means that the buffers must use less symbols period delays and the delay elements must be set to longer paths. This enable to determine the direction, on which the delay must be adjusted and therefore to reduce by half the number of steps necessary to initialize the system of FIG. 9 according to the procedure of FIG. 4. Notably, the length of the path of the un-modulated lightwave, or source channel, is strictly longer than the paths of the other space-division multiplexed signals.

In an alternative implementation of the invention, the single core fiber 951 of the delay element 940 is designed for instance shorter than the n−1 other single core fibers 952 to 95(n), so that the (n−1) modulated lightwave signals are delayed by 10 ms with respect to the un-modulated lightwave. In that case, the (n−1) optical delay elements identical to the elements 561 to 566 of FIG. 6, which are comprised in the receiver 922 and the digital buffers inside the inter DSP units identical to the units 621 to 626 of FIG. 6, which are comprised in the receiver 922 must be set to augment the delay of the un-modulated lightwave; this means that the buffers must use more symbols period delays and the delay elements must be set to shorter paths. This enable to determine the direction, on which the delay must be adjusted and therefore to reduce by half the number of steps necessary to initialize the system of FIG. 9 according to the procedure of FIG. 4. Notably, the length of the path of the un-modulated lightwave, or source channel, is strictly shorter than the paths of the other space-division multiplexed signals.

In another implementation of the invention, the transponders 901 and 902, the lines 930 and 931 as well as the delay elements 940 and 943 are based on 19 spatially multiplexed channels. The MCF of the lines 930 and 931 are 19-core MCF. The transponders 901 and 902 transmit and receive 18 modulated lightwave signals and one un-modulated lightwave carrier.

Fifth Description of Embodiments

Figure 10:
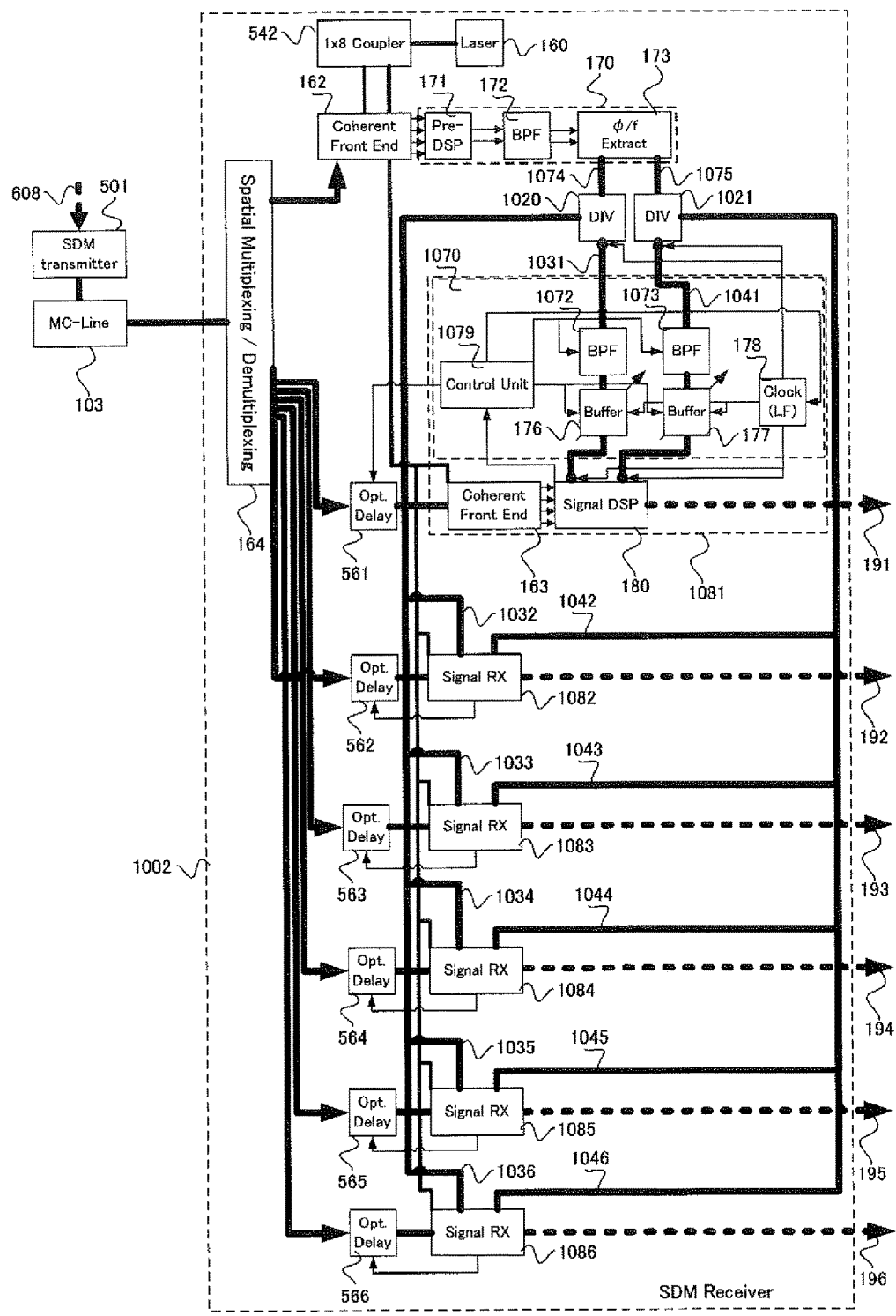
FIG. 10 is a schematic representation of an optical system, using space division multiplexing, transmitting and receiving optical signals according to a fifth exemplary embodiment of the invention.

FIG. 10 is a schematic representation of an optical system including an optical transmitter 501, which uses SDM, an optical receiver 1002, which uses SDM and a transmission line 103, which uses MCF. The elements denoted with the numerals 103, 160, 162 to 164, 170 to 173, 176 to 178, 180, and 191 to 196 are described on FIG. 1. The elements denoted with the numerals 501, 542, and 561 to 566 are described on FIG. 5. The transmitter 501 and the receiver 1002 are communicating through the line 103. The transmitter 501 is fed with the binary data stream 608 and generates a SDM signal launched the MCF of the line 103.

The receiver 1002 comprises a spatial de-multiplexer 164, which de-multiplexes the output of the MCF of the line 103 into 7 lightwave signals. After de-multiplexing with the de-multiplexer 164, the un-modulated lightwave is fed to the coherent frontend 162. The other six light waves, which consist in six modulated signals, are fed into the optical delay elements 561 to 566. The frequency information extracted by the processing unit 173 from the un-modulated lightwave is fed to the low rate lane 1074. The phase information extracted by the processing unit 173 from the un-modulated lightwave is fed to the low rate lane 1075. The divider 1020 splits the lane 1074 into 6 identical low rate signals on the respective low rate lanes 1031, 1032, 1033, 1034, 1035 and 1036, which are provided to the respective receivers 1081, 1082, 1083, 1084, 1085 and 1086. The divider 1021 splits the lane 1075 into 6 identical low rate signals on the respective low rate lanes 1041, 1042, 1043, 1044, 1045 and 1046, which are provided to the respective receivers 1081, 1082, 1083, 1084, 1085 and 1086. The respective receivers 1081, 1082, 1083, 1084, 1085 and 1086 receive and process lightwave signals passing through the respective delay elements 561, 562, 563, 564, 565 and 566 to generate the respective binary data stream 191, 192, 193, 194, 195 and 196. The receivers 1081 to 1086 are identical. The receiver 1081 comprises a frontend 163 a DSP 180 and an inter DSP unit 1070. Alternatively, the inter DSP unit 1070 can be integrated in the DSP 180. The low rate lanes 1031 and 1041 pass through the inter DSP unit 1070 and it is provided to the DSP unit 180 so that the information they carry is used in the signal processing of the DSP 180. The inter DSP unit 1070 comprises the digital band pass filter 1072, the digital buffer 176 on the low rate lane 1031, the digital band pass filter 1073, and the digital buffer 177 on the low rate lane 1041. The inter DSP unit 1070 also comprises the low rate clock generator 178, which control the clock rate of the low rate lanes 1031 and 1041, of the digital buffers 176 and 177. The inter DSP unit 1070 also comprises the control unit 1079, which controls the rate of the generator 178, the setting of the buffers 176 and 177, and the bandwidth of the band pass filters 1072 and 1073. Additionally, the control unit 1079 also controls the setting of the delay element 561.

The system of FIG. 10 can be controlled according to a sequence similar to the one described on FIG. 4. In the case of FIG. 10, the rate of the respective lanes 1031 to 1036 and 1041 to 1046 is controlled by the control unit of the inter DSP unit of the respective receivers 1081 to 1086. Similarly, for each of the receiver 1081 to 1086, the bandwidth of the pass band filter of their respective inter DSP units is controlled by the respective control unit of their respective inter DSP units. The bandwidth of the filter 172 is fixed to half of the maximum rate allowed for the low rate lanes 1031 to 1036 and 1041 to 1046. Alternatively, the bandwidth of the filter 172 can be set by the control unit of an inter DSP unit of a receiver 1081 to 1086. Notably, the system of FIG. 10 has seven space-division multiplexed signals, among which one is a source signal made of an un-modulated lightwave and the remaining six signals are destination signals of modulated lightwave. The system features one processing unit for the source signal, which provides information lanes for each of the destination signals.

According to the shared carrier reception method used in the system of FIG. 10, the characteristics of the signal received by the DSP of the receivers 1081, 1082, 1083, 1084, 1085 and 1086 is improved in virtue of compensation of phase noise. The value of the band pass filter is optimal and the timing between the DSP 170 and the DSP of the receivers 1081 to 1086 is optimal, independently of the skew between cores of the MCF of the line 103. Moreover, the maximum required buffer for adjustment is reduced by virtue of reduction of the clock rate. This reduces power consumption of the receiver 1002 and simplifies implementation. Furthermore, by combination of digital buffer and optical delay, the invention presents versatile and fast adaptive setting of timing through low rate digital buffer between DSP as well as even lower power consumption by setting of delay in the optical domain and offloading one part of the digital buffer delay to optical delay.

It is apparent that the present invention is not limited to the above described embodiments, which can be modified and changed without departing from the scope of the invention.

INDUSTRIAL APPLICABILITY

This invention can be applied to an optical communication system which utilizes space-division multiplexing.

(1) A transmission system including:
a transmission unit of lightwave over several spatial-division multiplexed channels; and
reception units receiving signals from said channels;
wherein said reception unit includes;
a first processing unit processing a first signal received from a source channel, said source channel is one of said channels, and including a filtering unit to filter said first signal in digital domain, and extract unit to extract a information from said first signal;
a second processing unit processing a second signal received from a destination channel, said destination channel is one of said channels and said source channel and said destination channel are distinct from each other;
a third processing unit providing said information extracted from said first signal to said second signal, wherein said third processing unit executes;
providing said information from said first processing unit to said second processing unit using information lanes of a clock rate strictly lower than the symbol rate of said second signal, each of said information lanes includes a digital buffer driven at the same rate as said information lane, said information provided from said first processing unit is used in said second processing unit;

a monitoring unit to generate a monitor signal according to the quality of said second signal; and a control unit, controlling a skew between said first signal and said second signal in a bandwidth of said filtering units in said first processing unit, said control unit uses a value of said monitor signal and said digital buffer on said information lane between said first processing unit and said second processing unit.

(2) The transmission system according to (1), wherein:

said the lightwave of said source channel is a continuous wave light generated from the same lightwave source used for the lightwave carrier of said destination channel, said continuous wave light and said lightwave signal of said destination channel are received coherently using the same local oscillator, said information extracted from said first signal contains information relative to a frequency of said continuous wave light of said source channel and a phase of the continuous wave light of said source channel;

said information lane includes two sub-lanes, one of said sub-lane carries said information on said frequency of said continuous wave light of said source channel and the other of said sub-lanes carries said information on the phase of said continuous wave light of said source channel;

said second processing unit process phase and frequency of said second signal using said information on the frequency and said information on the phase of the continuous wave light of said source channel, and said control unit control said skew between said continuous wave light and said second signal according to the following steps:

first step: setting the bandwidth of said digital filtering units in the processing of said continuous wave light to a value lower than half of the symbol rate of said destination channel, second step: controlling said skew so that said monitor generated from said destination channel reaches an optimum, third step: reducing the value of said digital bandwidth and controls said skew so that said monitor reaches an optimum, fourth step: comparing the two last optimal values of said monitor obtained for the two last set values of said bandwidth of said digital filter, and fifth step: repeating fourth step when the two last optimal values different from each other.

(3) The system any one of (1) or (2), wherein said control unit set a clock rate of said information lanes proportionally to said value of said digital filtering unit.

(4) The system any one of (1) to (3), wherein said control unit controls optical delay control components placed on the optical path of lightwave of said system.

(5) The system any one of (1) to (4), wherein a path on which said source channel is transmitted is strictly longer than other paths of said spatial-division multiplexed signals.

(6) The system any one of (1) to (4), wherein said path, on which said source channel is transmitted, is strictly shorter than other paths of said spatial-division multiplexed signals.

(7) The system any one of (1) to (6), wherein said monitor signal is generated according to the number of error corrected by forward error correction on said destination channel.

(8) The system any one of (1) to (6), wherein said monitor signal is generated according to the power of a tapped portion of monitor of the phase rotation information of the signal of said destination channel, and said information of phase rotation is comprised in a bandwidth equal to the bandwidth of said filtering means in said source continuous lightwave.

(9) The system any one of (1) to (8), wherein said channels except said source channel are said destination channel, said second processing unit, said monitoring unit and control unit process each of said second signal received from each of said destination channels, and said information lanes are provided for each of said destination channels.

(10) The system according to (2), wherein said control unit further control said skew with the following additional step after said fifth step:

controlling said skew so that said monitor signal reaches an optimum said bandwidth of said digital filtering unit is kept constant, and said additional step is performed after said fifth step is completed.

(11) A reception unit receiving signals of lightwave over several spatial-division multiplexed channels; wherein said reception unit includes;

reception units receiving signals from said channels;

wherein said reception unit includes;

a first processing unit processing a first signal received from a source channel, said source channel is one of said channels, and including a filtering unit to filter said first signal in digital domain, and extract unit to extract a information from said first signal;

a second processing unit processing a second signal received from a destination channel, said destination channel is one of said channels and said source channel and said destination channel are distinct each other;

a third processing unit providing said information extracted from said first signal to said second signal said third processing unit executes;

providing said information from said first processing unit to said second processing unit using information lanes of a clock rate strictly lower than a symbol rate of said second signal, each of said information lanes includes a digital buffer driven at the same rate as said information lane, said information provided from said first processing unit is used in said second processing unit;

a monitoring unit to generate a monitor signal according to the quality of said second signal; and a control unit, controlling a skew between said first signal and said second signal in a bandwidth of said filtering units in said first processing unit, said control unit uses a value of said monitor signal and said digital buffer on said information lane between said first processing unit and said second processing unit.

(12) The reception unit according to (11), wherein:

said the lightwave of said source channel is a continuous wave light generated from the same lightwave source used for the lightwave carrier of said destination channel, said continuous wave light and said lightwave signal of said destination channel are received coherently using the same local oscillator, said information extracted from said first signal contains information relative to a frequency of said continuous wave light of said source channel and a phase of the continuous wave light of said source channel;

said information lane includes two sub-lanes, one of said sub-lane carries said information on said frequency of said continuous wave light of said source channel and the other of said sub-lanes carries said information on the phase of said continuous wave light of said source channel;

said second processing unit process phase and frequency of said second signal using said information on the frequency and said information on the phase of the continuous wave light of said source channel, and said control unit control said skew between said continuous wave light and said second signal according to the following steps:

first step: setting the bandwidth of said digital filtering units in the processing of said continuous wave light to a value lower than half of the symbol rate of said destination channel, second step: controlling said skew so that said monitor generated from said destination channel reaches an optimum, third step: reducing the value of said digital bandwidth and controls said skew so that said monitor reaches an optimum, fourth step: comparing the two last optimal values of said monitor obtained for the two last set values of said bandwidth of said digital filter, and fifth step: repeating fourth step when the two last optimal values different each other.

(13) The reception unit any one of (1) or (2), wherein said control unit set a clock rate of said information lanes proportionally to said value of said digital filtering unit.

(14) The reception unit any one of (11) to (13), wherein said control unit controls optical delay control components placed on the optical path of lightwave of said system.

(15) The reception unit any one of any of (11) to (14), wherein a path on which said source channel is transmitted is strictly longer than other paths of said spatial-division multiplexed signals.

(16) The reception unit any one of (11) to (14), wherein said path, on which said source channel is transmitted, is strictly shorter than other paths of said spatial-division multiplexed signals.

(17) The reception unit any one of (11) to (16), wherein said monitor signal is generated according to the number of error corrected by forward error correction on said destination channel.

(18) The reception unit any one of (11) to (16), wherein said monitor signal is generated according to the power of a tapped portion of monitor of the phase rotation information of the signal of said destination channel, and said information of phase rotation is comprised in a bandwidth equal to the bandwidth of said filtering means in said source continuous lightwave.

(19) The reception unit any one of (11) to (18), wherein said channels except said source channel are said destination channel, said second processing unit, said monitoring unit and control unit process each of said second signal received from each of said destination channels, and said information lanes are provided for each of said destination channels.

(20) The reception unit according to (12), wherein said control unit further control said skew with the following additional step after said fifth step:

controlling said skew so that said monitor signal reaches an optimum said bandwidth of said digital filtering unit is kept constant, and said additional step is performed after said fifth step is completed.

What is claimed is:

1. A transmission system comprising:
a transmitter transmitting light over a plurality of spatial-division multiplexed channels; and
a receiver receiving signals from said plurality of spatial-division multiplexed channels, wherein said receiver comprises:
a first circuit processing a first signal received from a source channel, wherein said source channel is one of said plurality of spatial-division multiplexed channels, wherein said first circuit comprises:
a digital filter, and
a processor which extracts information from said first signal;
a second circuit processing a second signal received from a destination channel, wherein said destination channel is one of said plurality of spatial-division multiplexed channels, wherein said source channel and said destination channel are distinct from each other, and wherein the second circuit generates a monitor signal representative of a quality of said second signal;
a third circuit providing said information, extracted from said first signal, from said first circuit, to said second circuit, via a data lane, at a clock rate lower than a symbol rate of said second signal, wherein said data lane comprises a digital buffer driven at a same clock rate as said clock rate of said data lane; and
a controller controlling a skew between said first signal and said second signal, wherein the controller sets a bandwidth of said digital filter, by using a value of said monitor signal and a value of said digital buffer.

2. The transmission system according to claim 1, wherein:
said information extracted from said first signal comprises frequency information of a continuous wave transmitted in said source channel and phase information of said continuous wave transmitted in said source channel;
said data lane comprises a first lane which transmits said frequency information of said first signal and a second sub-lane which transmits said phase information of said first signal;
said second circuit processes a phase of said second signal and a frequency of said second signal using said frequency information and said phase information of said first signal; and
said controller control said skew between said first signal and said second signal by completing:
a first step comprising: setting a bandwidth value of said digital filter in the processing of said continuous wave to a value lower than half of the symbol rate of said second signal,
a second step comprising: controlling said skew so that said monitor signal reaches a first global extremum,
a third step comprising: reducing the bandwidth value and controlling said skew so that said monitor signal reaches a second global extremum,
a fourth step comprising: comparing the first global extremum and second global extremum of said monitor signal obtained for the bandwidth value and the reduced bandwidth value, respectively, and a fifth step comprising: repeating the third step and the fourth step
  when a last global extremum is lower than and not equal to a second to last global extremum and when said second to last global extremum is a minimum;
  when the last global extremum is higher than and not equal to the second to last global extremum and when said second to last global extremum is a maximum; or
  when said reduced bandwidth value reaches a minimum settable value.

3. The system claim 1, wherein said controller sets a clock rate of said data lane proportionally to said bandwidth of said digital filter.

4. The system claim 1, wherein said controller controls optical delay components placed on an optical path of light of said transmission system.

5. The system claim 1, wherein a path on which said source channel is transmitted is longer than other paths of said plurality of spatial-division multiplexed channels.

6. The system claim 1, wherein said path on which said source channel is transmitted, is shorter than other paths of said plurality of spatial-division multiplexed channels.

7. The system claim 1, wherein said monitor signal is generated according to a number of errors corrected by forward error correction on said destination channel.

8. The system claim 1, wherein
  the number of said plurality of space-division multiplexed channels of said transmission system is an integer greater than or equal to 2;
  wherein said second circuit is provided for said destination channel;
  at least one data lane is provided for said destination channel;
  said second circuit processes said second signal received from said destination channel; and
  said controller processes said second signal received from said destination channel.

9. The system according to claim 2, wherein
  said controller further control said skew with the following additional steps performed after said fifth step is completed:
    a sixth step comprising: controlling said skew so that said monitor signal reaches the last global extremum
    a seventh step comprising: maintaining said bandwidth value of said digital filter constant.

10. A receiving signals from a plurality of spatial-division multiplexed channels, wherein said receiver comprises:
  a first circuit processing a first signal received from a source channel, wherein said source channel is one of said plurality of spatial-division multiplexed channels, wherein said first circuit comprises:
    a digital filter, and
    a processor which extracts information from said first signal;
  a second circuit processing a second signal received from a destination channel, wherein said destination channel is one of said plurality of spatial-division multiplexed channels, wherein said source channel and said destination channel are distinct each other, and wherein the second circuit generates a monitor signal representative of a quality of said second signal;
  a third circuit providing said information, extracted from said first signal, from said first circuit, to said second circuit, via a data lane, at a clock rate lower than a symbol rate of said second signal, wherein said data lane comprises a digital buffer driven at a same clock rate as said clock rate of said data lane;
  and
  a controller controlling a skew between said first signal and said second signal, wherein the controller sets a bandwidth of said digital filter, by using a value of said monitor signal and a value of said digital buffer.

* * * * *